US012536238B1

(12) United States Patent
Warr et al.

(10) Patent No.: US 12,536,238 B1
(45) Date of Patent: Jan. 27, 2026

(54) GENERATING CONNECTOR SUGGESTIONS BASED ON BROWSING DATA

(71) Applicant: Dropbox, Inc., San Francisco, CA (US)

(72) Inventors: Andrew Warr, San Francisco, CA (US); Jacob Solomon, Austin, TX (US); Noorain Noorani, New York, NY (US); Sabarish Mahadevan, Arrington, TN (US); Tony Xu, Redmond, WA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 19/003,694

(22) Filed: Dec. 27, 2024

Related U.S. Application Data

(60) Provisional application No. 63/698,295, filed on Sep. 24, 2024.

(51) Int. Cl.
  *G06F 16/9535* (2019.01)
  *G06F 16/9538* (2019.01)

(52) U.S. Cl.
  CPC ...... *G06F 16/9535* (2019.01); *G06F 16/9538* (2019.01)

(58) Field of Classification Search
  CPC ............. G06F 16/9535; G06F 16/9536; G06F 16/9538; G06F 16/951; G06F 16/953; G06F 16/9532
  See application file for complete search history.

(56) References Cited

U.S. PATENT DOCUMENTS

| | | | |
|---|---|---|---|
| 8,606,643 B2 * | 12/2013 | Lawrence | G06Q 50/01 705/26.1 |
| 8,887,134 B2 | 11/2014 | Weatherhead et al. | |
| 8,903,597 B2 | 12/2014 | Jones | |
| 9,246,288 B2 | 1/2016 | Jones | |
| 9,565,078 B1 * | 2/2017 | Smith | H04L 67/63 |
| 9,582,549 B2 * | 2/2017 | LeBeau | G06F 16/951 |
| 10,229,164 B1 * | 3/2019 | Hampson | G06F 16/9535 |
| 10,303,337 B2 | 5/2019 | Teytelman et al. | |
| 11,461,428 B2 * | 10/2022 | Arnold | G06N 20/00 |
| 2010/0198632 A1 | 8/2010 | Arora | |
| 2012/0030773 A1 * | 2/2012 | Schwesig | G06F 21/36 726/28 |

(Continued)

*Primary Examiner* — Kris E Mackes
(74) *Attorney, Agent, or Firm* — Keller Preece PLLC

(57) ABSTRACT

The present disclosure relates to systems, non-transitory computer-readable media, and methods for linking third-party applications to a user account on a content management system. In particular, the disclosed systems can receive browsing data related to browsing activity from a user associated with a user account on a content management system via a software extension on a browser application. The disclosed systems can identify a third-party application external to the content management system based on the browsing data. Upon identifying the third-party application, the disclosed systems can provide for display a selectable connector suggestion on a graphical user interface of a client device. In one or more implementations, based on receiving an indication of a selection of the selectable connector suggestion, the disclosed systems can generate a digital connection that communicatively links the third-party application to the user account on the content management system.

20 Claims, 11 Drawing Sheets

(56) References Cited

U.S. PATENT DOCUMENTS

| | | | |
|---|---|---|---|
| 2013/0218687 A1* | 8/2013 | Sohangir | G06Q 30/0241 |
| | | | 705/14.66 |
| 2014/0026080 A1 | 1/2014 | Teytelman et al. | |
| 2014/0053197 A1 | 2/2014 | Shoykher et al. | |
| 2014/0245411 A1 | 8/2014 | Meng et al. | |
| 2015/0057874 A1 | 2/2015 | Jones | |
| 2015/0363403 A1 | 12/2015 | Khalatov et al. | |
| 2020/0167498 A1* | 5/2020 | Pridgen | G06F 21/6245 |
| 2024/0045581 A1* | 2/2024 | Gambhir | G06F 9/451 |

* cited by examiner

GENERATING CONNECTOR SUGGESTIONS BASED ON BROWSING DATA

CROSS-REFERENCE TO RELATED APPLICATIONS

This application claims priority to and the benefit of U.S. Provisional Patent Application No. 63/698,295 filed on Sep. 24, 2024, which is incorporated herein by reference in its entirety.

BACKGROUND

Recent years have seen significant development in generating and storing content across various applications and locations. For example, the advancement of computer applications has allowed users to perform various and/or specialized tasks with certain applications. For example, a user can generate an image with a first computer application and draft a document with a second application. Indeed, the diversification and advancement in computer applications, specialized computer applications, and/or third-party systems, causes users to generate separate user accounts across several computer applications and/or third-party systems, thus forcing users to perform tasks and store information across multiple platforms. Many conventional systems try addressing such disjointed storage and task performance by utilizing architectures to reduce the number of user accounts and/or logins by sharing information and functions across related computer applications (or programs). Despite these advancements, systems and user accounts struggle to synchronize and access dispersed information and overlapping functions in an efficient and flexible manner.

As just mentioned, some existing systems are computationally inefficient. In particular, users can have several user accounts across multiple unrelated third-party servers (e.g., computer applications) where they store files, images, and/or videos. Because of their separate, siloed nature, existing systems use multiple disparate search functions across the various applications to separately access, query, utilize, and search databases specific to each computer application. Not only does such a process waste computing resources by iteratively performing the same search query across multiple platforms (or by performing many searches across different platforms), but such processes also require an inordinate amount of user interaction with various graphical user interfaces and/or windows. For example, when a user searches for a specific piece of information by submitting a search query in a first computer application, the user must navigate through several—and sometimes an inordinate number of—results only to discover that the file they searched for does not or no longer exists in the database accessible by the first computer application. Thus, the user must access a second computer application and blindly perform the same task. In some cases, the user performs this cycle a number of times by navigating through several computer applications before finding their intended file (e.g., performing online searches and local database searches). Such uninformed and antiquated processes waste computing resources by repeatedly performing the same task and further result in inefficient navigation among the many interfaces and applications involved.

As just mentioned, many existing systems that utilize architectures to unite information and functions across third-party applications are inflexible. For example, some conventional systems only unite information across applications that exist within a single digital ecosystem. Such limited access restricts a user's ability to connect their information and causes users to needlessly search across multiple platforms to find a target content item.

SUMMARY

One or more embodiments described herein provide benefits and/or solve one or more problems in the art with systems, methods, and non-transitory computer readable storage media that utilize connectors to link data to enable universal (or unified) searching. In one or more embodiments, the connector management system can receive browsing data related to browsing activity from a user associated with a user account on a content management system through a software extension on a browser application. In some cases, the connector management system can use the browsing data to identify a third-party application external to the content management system. Upon identifying the third-party application, the connector management system can generate and provide for display a selectable connector suggestion for the third-party application that links and/or connects data from the third-party application with the content management system. In one or more implementations, based on receiving a selection of the selectable connector suggestion, the connector management system can generate a digital connection (or connector) that communicatively links the third-party application to the user account on the content management system.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
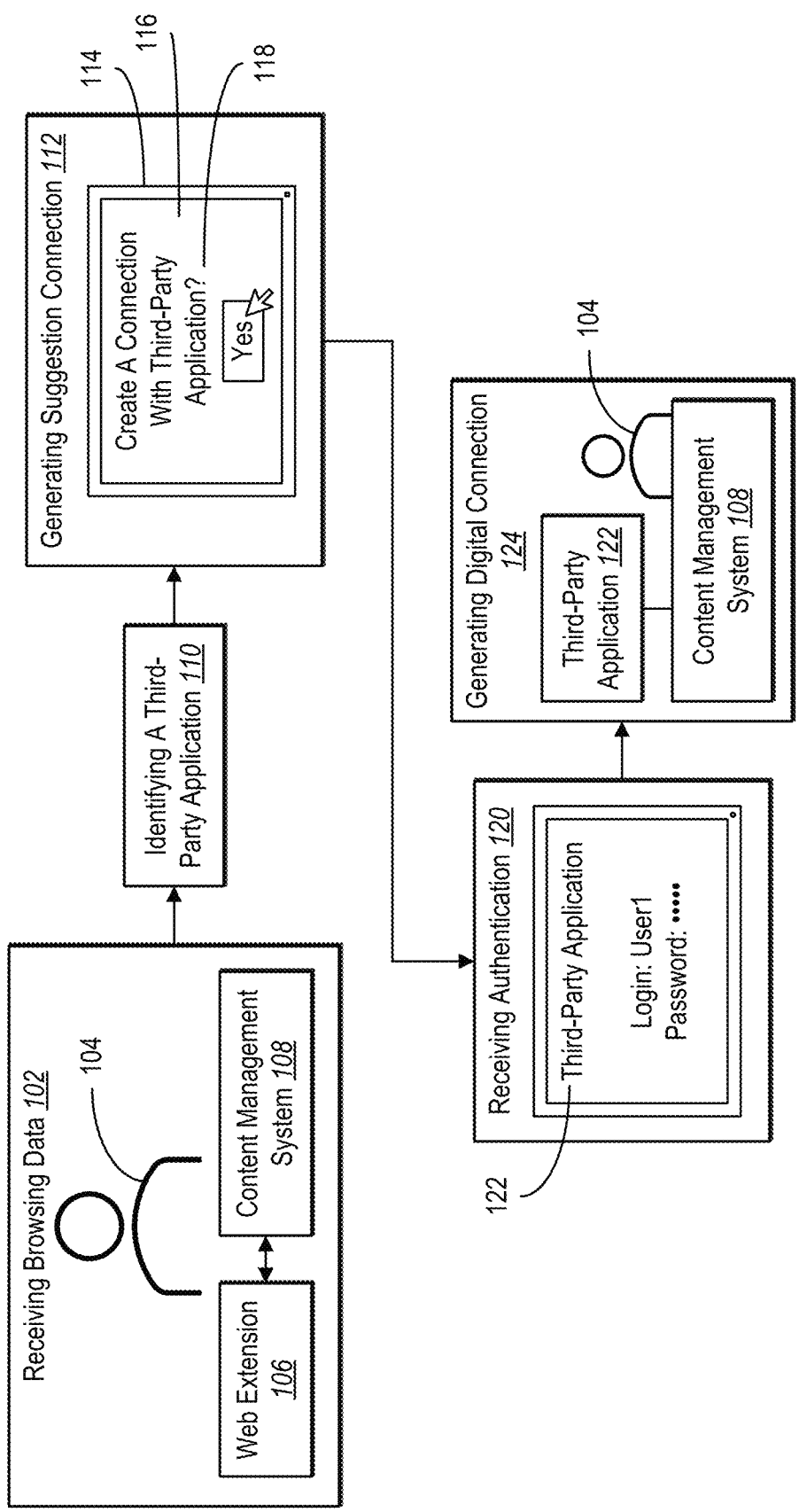
FIG. 1 illustrates an example overview of a connector management system providing for display a selectable connector suggestion corresponding to a third-party application that is external to a content management system in accordance with one or more embodiments.

This disclosure describes embodiments of a connector management system that improves the effectiveness, efficiency, and flexibility of returning results to searches or queries by intelligently recommending one or more digital connectors to link a user account within a content management system to an external third-party application. FIG. 1 illustrates an example overview of a connector management system providing for display a selectable connector suggestion corresponding to a third-party application that is external to a content management system in accordance with one or more embodiments.

Figure 9:
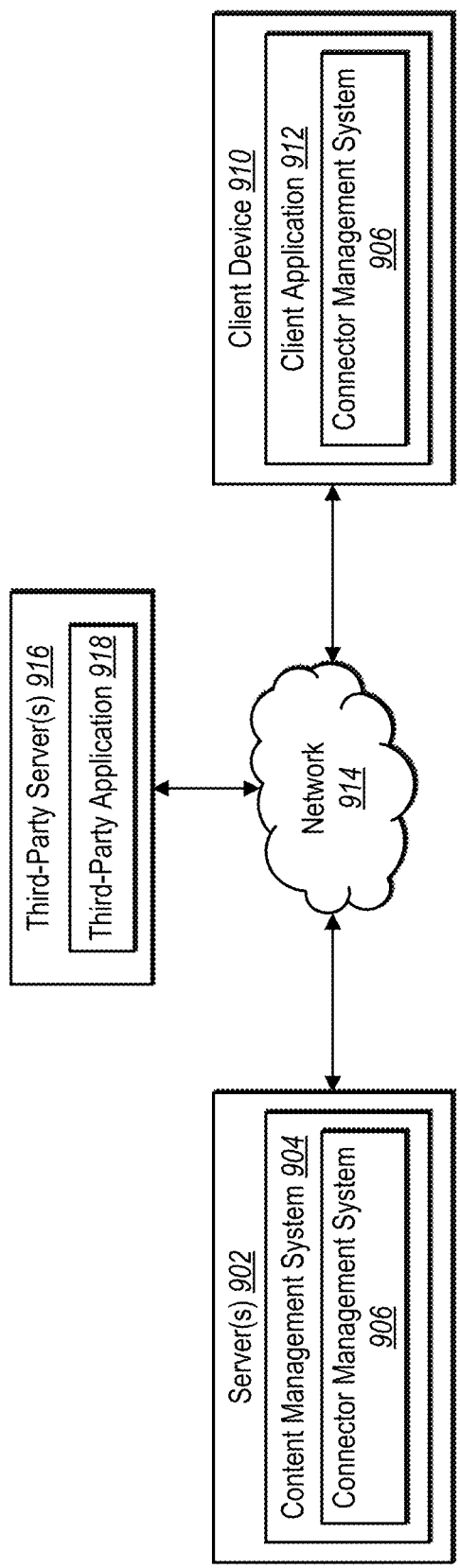
FIG. 9 illustrates an example environment within which a connector management system can operate in accordance with one or more embodiments.

As shown in FIG. 1, the connector management system 906, discussed in FIG. 9, can perform an act 102 of receiving browsing data corresponding to browsing activity associated with a user account 104. In particular, the connector management system 906 can, through a web extension 106 established (or installed) on one or more web-browsers, monitor, track, and/or detect browsing activity (e.g., one or more user interactions) with a third-party application 122 and/or multiple third-party applications. Indeed, the web extension 106 can enable the connector management system 906 to receive and/or detect how a user associated with a user account 104 on the content management system 108 accesses, utilizes, and/or relies on the third-party application 122.

As further shown in FIG. 1, the connector management system 906 can perform an act 110 of identifying a third-party application. More specifically, based on the browsing data, the connector management system 906 can identify and/or determine a third-party application 122. For example, the connector management system 906, via the web extension 106, can extract and/or detect identifiers, signatures, and/or metadata associated with the third-party application 122 to identify the third-party application 122.

As FIG. 1 illustrates, the connector management system 906 can perform the act 112 of generating a connector suggestion. For example, the connector management system 906 can generate and provide for display on a graphical user interface 116 of a client device 114, a selectable connector suggestion 118 corresponding to an unlinked third-party application. In some embodiments, the selectable connector suggestion 118 can include a connector suggestion along with a selectable element. For example, as shown in FIG. 1, the selectable connector suggestion 118 can include the question "create a connection with third-party application?" along with the "yes" selectable element. In some cases, the selectable connector suggestion 118 can be the question "create a connection with third-party application?" In one or more embodiments, in response to receiving a selection and/or an indication of a selection of the selectable connector suggestion 118 (or the selectable element within the selectable connector suggestion), the connector management system 906 can generate a digital connection between the user account 104 and the third-party application 122.

In one or more implementations, before generating the digital connection, the connector management system 906 can perform the act 120 of receiving authentication for the third-party application 122. For example, the connector management system 906 can request and receive permission to access the data, information, functions, and/or material stored on or associated with the third-party application 122. For example, the connector management system 906 can initiate a flow for the user of the user account 104 to input login credentials (e.g., username and password) for the third-party application 122 which would give access to the third-party application 122. In one or more embodiments, requesting (or receiving) authentication credentials can include the connector management system 906 fetching corresponding authentication credentials (e.g., usernames, passwords, and/or pins) already stored on the content management system 108. For example, based on the content management system 108 storing authentication credentials for a third-party email application, the connector management system 906 can pull and utilize the stored authentication credentials to gain access to the third-party email application and generate a digital connection between the third-party email application and the content management system 108.

As mentioned above and shown in FIG. 1, the connector management system 906 can perform an act 124 of generating a digital connection (or connector). In particular, the connector management system 906 can generate a digital connection that communicatively links the data, information, functions, and/or materials stored on and/or within the third-party application with the user account 104 on the content management system 108. In some cases, once the connector management system 906 generates the digital connection (or connector), the connector management system 906 can download, ingest, and/or synchronize the data, information, and/or materials from the third-party application 122 to the content management system 108. In some cases, the connector management system 906 can access one or more functions associated with the third-party application 122. In one or more embodiments, the digital connection (or connector) is accomplished via an API layer between the content management system and the third-party application 122. Thus, the digital connection can expand the connector management systems 906 access to data, information, materials, functions, and/or content items associated with the user account that is spread across various sources (e.g., third-party applications).

As illustrated by the foregoing discussion, the present disclosure utilizes a variety of terms to describe the features and benefits of the connector management system. Additional detail is hereafter provided regarding the meaning of these terms as used in this disclosure. For example, as used herein, the term "software extension" refers to an add-on, plug-in, macro, program, or module applied to an application that generates an additional function and/or extends a function of the application. For example, a software extension can be added to a web browser application to enable access to browsing activity associated with a user account. In particular, a software extension can receive, monitor, and/or detect one or more user interactions with a computer application. For instance, a software extension can detect a query and/or prompt in a computer application that is external to a content management system. In one or more cases, the software extension can be an add-on (e.g., macro and/or plug-in) to an operating system, web-application, and/or a desktop application that can collect browsing data and/or browsing activity within the operating system, web-application, and/or the desktop application.

Moreover, as used herein, the term "browsing data" refers to data or information related to and/or stored by one or more web-browsers and/or web-applications. For example, browsing data can include a record of websites and/or web applications visited by a user account, cookies, autofill information, site-specific settings, login credentials, IP address, user interactions, browsing activities, etc., for a web-browser and/or web-application. In some cases, browsing data can include historic browsing data (or browser history) related to one or more previous sessions with one or more web-browsers and/or web-applications. For example, historic browsing data can include a record of visited websites and/or web applications. In some cases, browsing data can include current browsing data related to an active session with one or more web-browsers and/or web-applications. Relatedly, as used herein, the term "browsing activity" refers to a log and/or record of interactions, activities, and/or navigations while utilizing browser applications such as, one or more web-browsers and/or web applications. For example, browsing activity can include user inputs, clicks, streams, queries, hovers, etc. In some embodiments, browsing activity can include navigations and/or user interactions with a system-based (or desktop) application.

Moreover, as used herein, the term "third-party application" refers to a computing application or software that performs one or more function that corresponds to a third-party external to a content management system. For example, a third-party application can enable performing certain tasks such as, but not limited to, photo editing, document creation, financial reporting, medical recording, etc. In one or more embodiments, a third-party application can be a desktop application, mobile-based operating application, or web-based application.

Moreover, as used herein, the term "selectable connector suggestion" refers to a selectable element provided for display on a graphical user interface of a client device. In one or more embodiments, a selectable connector suggestion can correspond to a third-party application. In particular, a selectable connector suggestion can indicate a potential digital connection that increases the breadth or corpus of a search index related to data, content items, and/or information associated with a user account.

Relatedly, as used herein, the term "digital connection" (or more simply "connector") refers to a computer code segment, application, or program that retrieves or extracts data and/or features that define information from user-account-facing applications (e.g., third-party applications), such as digital calendars, video call applications, email applications, text messaging applications, digital document applications, financial applications, medical applications, and other applications. In some cases, a connector is as described by Vasanth Krishna Namasivayam et al. in U.S. patent application Ser. Nos. 18/478,061 and 18/478,066, titled GENERATING AND MAINTAINING COMPOSITE ACTIONS UTILIZING LARGE LANGUAGE MODELS, filed Sep. 29, 2023, both of which is incorporated herein by reference in their entireties. In one or more implementations, a connector is as described by Aniruddh Rao et al. in U.S. patent application Ser. No. 18/776,830, titled DATA INGESTION UTILIZING A COORDINATOR AND CONNECTORS, filed Jul. 18, 2024. A digital connection can use web hooks, long polling, another protocol to ingest content from an external source (e.g., third-party application) into the environment of a content management system for interaction with content management system functions, including those of a connector management system.

Additionally, as used herein, the term "digital content item" (or simply "content item") refers to a digital object or a digital file that includes information interpretable by a computing device (e.g., a client device) to present information to a user. A digital content item can include a file or a folder such as a digital text file, a digital image file, a digital audio file, a webpage, a website, a digital video file, a web file, a link, a digital document file, or some other type of file or digital object. A digital content item can have a particular file type or file format, which may differ for different types of digital content items (e.g., digital documents, digital images, digital videos, or digital audio files). In some cases, a digital content item can refer to a remotely stored (e.g., cloud-based) item or a link (e.g., a link or reference to a cloud-based item or a web-based content item) and/or a content clip that indicates (or links/references) a discrete selection or segmented sub-portion of content from a webpage or some other content item or source. A content item can also include application-specific content that is specific to a particular computer application and is accessible via a file system or via a network connection. A digital content item can be editable or otherwise modifiable and can also be sharable from one user account (or client device) to another. In some cases, a digital content item is modifiable by multiple user accounts (or client devices) simultaneously and/or at different times.

As indicated above, the connector management system 906 provides a number of advantages over conventional systems. In particular, the connector management system 906 provides improved computational efficiency, navigational efficiency, flexibility and accuracy over existing systems.

For example, the connector management system 906 can improve navigational efficiency and computational efficiency over existing digital content search systems. Indeed, the connector management system 906 improves navigational efficiency by utilizing selectable connector suggestions that can link third-party applications to a single computer application and enable users to search content items located across various external server locations, local databases, and/or external computer applications within a single computer application and/or a single user interface enabling users to search content items within a single space. Indeed, while some prior systems require navigating through and interacting with many different applications and interfaces to search for particular content items, the connector management system 906 utilizes the selectable connector suggestions to generate a hybrid index and search result interface that reduces the navigational inefficiency. For example, the connector management system 906 does not have to process an excessive number of user interactions or inputs resulting from navigating between different applications and interfaces while searching for a content item because the connector management system 906 can receive a single search query and provide a search result with content items from different computer applications in a single, unified interface.

Additionally, the connector management system 906 improves computational efficiency by reducing the computational cost of (processing) an unnecessary number of search queries. Indeed, the connector management system 906 reduces the number of duplicative searches across different systems and/or applications. Unlike existing systems, the connector management system 906 efficiently processes a single search query across multiple computer applications and systems and provides relevant content items in the search result.

For example, the connector management system 906 provides improved flexibility by enabling users of user accounts to link third-party applications to a single computer application (e.g., content management system,) thereby uniting source content items, data, and other information spread across multiple sources (e.g., third-party applications) to be accessed from a single-entry point. For example, the connector management system 906 can detect a user account accessing a website via a software extension. Moreover, the connector management system 906 can identify a software connector that corresponds to a third-party application associated with the accessed website and surface to the user a selectable connector suggestion that generates a digital connection communicatively linking the third-party application corresponding to the website to the content management system. Thus, the user account can access source content items and/or functions within the website from the single computer application (e.g., content management system) without having to navigate to the website or corresponding third-party application. Relatedly, unlike some systems that can only link source content items within a limited digital ecosystem, the connector management system 906 can generate selectable connector suggestion for any type of third-party application and sync information access for any type of source content item by generating a digital connection (e.g., software connector) that links any third-party application to the single computer application (e.g., content management system).

Selectable Connector Suggestions for a User Account

Figure 2:
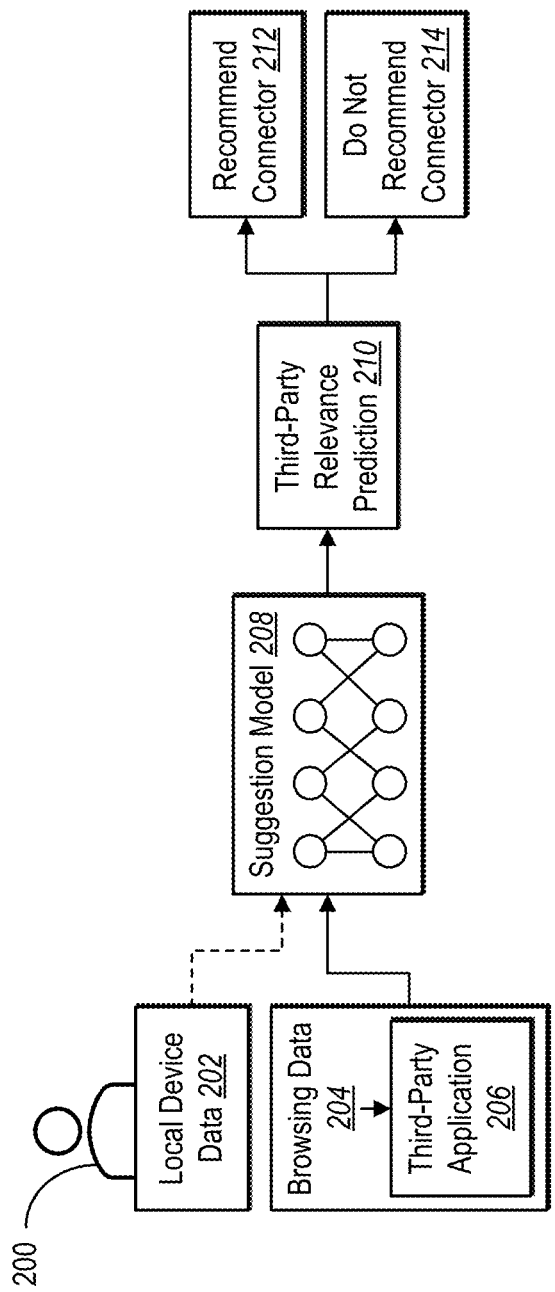
FIG. 2 illustrates a connector management system utilizing browsing data, local device data, and/or a third-party application along with a suggestion model to determine whether to provide for display a selectable connector suggestion on a graphical user interface of a client device in accordance with one or more embodiments.

As just discussed, the connector management system 906 can establish a digital connection that links a third-party application with a user account on a content management system. FIG. 2 illustrates a connector management system 906 utilizing browsing data, local device data, and/or a third-party application along with a suggestion model to determine whether to provide for display a selectable connector suggestion on a graphical user interface of a client device in accordance with one or more embodiments.

As shown in FIG. 2, the connector management system 906 can utilize local device data 202, browsing data 204, and/or a third-party application 206 (or more particularly, the identity of the third-party application) to determine whether to recommend generating a digital connection (or connector) between a user account 200 of the content management system and the third-party application 206. As just mentioned, the connector management system 906 can access the local device data 202. In one or more embodiments, local device data can include data, source content items, and/or other information stored directly and/or physically on a client device. For example, the local device data 202 can include one or more downloaded source content items stored within and/or managed by a desktop application (e.g., third-party desktop application), application data (e.g., settings) associated with the desktop application, and/or local storage of web-browser information (e.g., login information and/or preferences). In some cases, the local device data can include content items and/or data associated with a local content management system application (e.g., content management system desktop application). Additionally, in one or more embodiments, local device data 202 can include local user data corresponding to local user activity on the client device. As used herein, the term "local user data" can refer to one or more user interactions (e.g., browsing) with one or more content items, applications, and/or operating systems stored locally on a client device associated with the user account 200. For example, local user data can include accessing, editing, modifying, etc., one or more source content items within a desktop application. In some cases, local user data can include offline user activity with the client device.

Relatedly, in some embodiments, the content management system and/or the connector management system 906 can be stored locally on the client device as a computer application. In such cases, the connector management system 906 can access and/or store information related to third-party desktop applications launched by the content management system (e.g., local content management system application) and/or the connector management system 906. For example, the connector management system 906 can receive one or more user interactions, via the client device, to launch a third-party desktop calendar application. In some cases, the connector management system 906 can determine the identity of the third-party desktop calendar application and determine if a digital connection exists between the content management system and the third-party desktop calendar application.

In some cases, the connector management system 906 can access the browsing data 204. As indicated above, browsing data can include information related to the browsing activities of a user account with a web browser and/or web application. In some cases, the connector management system 906 can utilize a browser extension, which can act as a browser connection between the website and/or web application and the content management system. For example, the connector management system 906 can detect via the browser extension one or more user interactions (or browsing activity) with a website and/or a web application. To further illustrate, the connector management system 906 can detect a search for cloud-based design tool (e.g., Figma, InVision, Sketch) or a project management tool (e.g., Jira, DevRev, Notion). In some cases, the connector management system 906 can store browsing data history via the browser extension. For instance, the connector management system 906 can store one or more edits to an image (e.g., source content item) stored within the cloud-based design tool (e.g., website or web application).

As just discussed, the connector management system 906 can access various data sources related to the user account 200. As shown in FIG. 2, the connector management system 906 can access information about the third-party application 206 that is not communicatively linked to the content management system via a software connector. In particular, the connector management system 906 can determine the identity of the third-party application 206 via an identifier. For example, in one or more embodiments, the connector management system 906 can detect, via the web extension, a search query within a website and identify the website via the domain name, IP address, etc. of the website. In one or more embodiments, the connector management system 906 can determine if a third-party application 206 corresponds to a website. For example, based on detecting a search query on an email service website (e.g., Gmail.com), via the web extension, the connector management system 906 can determine that a third-party email service application (Gmail Application) corresponds to the email service website (Gmail.com). In some cases, the connector management system 906 can determine the identity of one or more third-party applications corresponding to one or more websites.

As shown in FIG. 2, the connector management system 906 can utilize a suggestion model 208 to analyze the local device data 202, the browsing data 204, and/or the third-party application 206 to determine a third-party relevance prediction 210. In some implementations, the suggestion model 208 can be a machine-learning model, neural network, and/or large language model that determines the third-party relevance prediction 210. In particular, the connector management system 906 can determine to recommend a connector 212 or do not recommend a connector 214 based on the third-party relevance prediction 210. Alternatively, in one or more cases, the suggestion model 208 can be a heuristic model that recommends one or more connectors based on one or more rules.

In one or more embodiments, the third-party relevance prediction 210 can be a score, likelihood, or determination of the usefulness and/or relevance of generating a digital connection between the third-party application 206 and the content management system for the user account 200. For example, based on the browsing data 204 indicating multiple queries (or searches) within a website associated with the third-party application 206, the connector management system 906 can utilize the suggestion model 208 to generate the third-party relevance prediction 210 indicating that access to the third-party application 206 via a digital connection would decrease the number of queries and/or add context to the search results that is relevant to the user associated with the user account 200 within the content management system. As another example, the connector management system 906 can detect (or receive from the client device associated with the user account 200) a current (or recent) search within a website via the web extension. Based on analyzing the current (or recent) search with the suggestion model 208, the connector management system 906 can determine to recommend generating the connector between the third-party application corresponding to the website and the user account of the content management system. Thus, based on the third-party relevance prediction 210, the connector management system 906 can conclude to recommend the connector 212.

In some embodiments, the connector management system 906 can utilize a third-party relevance prediction threshold to determine whether to recommend the connector 212 or do not recommend the connector 214. For example, if the third-party relevance prediction 210 exceeds the third-party relevance prediction threshold, the connector management system 906 can recommend the connector 212 by providing a selectable connector suggestion corresponding to the third-party application 206 for display on the client device. Alternatively, if the third-party relevance prediction 210 does not exceed the third-party relevance prediction threshold, the connector management system 906 will not recommend the connector 214. In some cases, the connector management system 906 can determine the third-party relevance prediction threshold. Alternatively, the connector management system 906 can receive user input (e.g., user interactions) setting the third-party relevance prediction threshold.

In some cases, the connector management system 906 can recommend a selectable connector suggestion based on detecting login credentials to a website and/or web application associated with the third-party application 206. For example, the connector management system 906 can detect the user account 200 logging into the website and/or web application based on receiving one or more user interactions inputting login credentials (e.g., username and password). In one or more implementations, the connector management system 906 can recommend generating a digital connection between the third-party application 206 and the content management system and utilize the login credentials to authorize access between the third-party application 206 and the content management system. Indeed, the connector management system 906 can generate and provide for display the selectable connector suggestion in a convenient and timely manner to the user account 200.

Alternatively, in some embodiments, the connector management system 906 can determine to recommend the connector 212 or not recommend the connector 214 based on one or more rules and/or a heuristic model. For example, if the connector management system 906, via the heuristic model, detects the user account 200 accessing the website or opening a tab or window associated with the third-party application 206, the connector management system 906 can recommend the connector 212. In some cases, based on the rules outlined by the heuristic model, the connector management system 906 can determine to recommend the connector 212 by detecting the launching of the third-party desktop application more than five times during a week (or other designated period of time). In some cases, if the user account 200 meets and/or exceeds spending a specific amount of time within the website associated with the third-party application 206, the connector management system 906 can determine to recommend the connector for the third-party application 206. In one or more embodiments, the heuristic model can receive user input dictating one or more rules for to recommend one or more connectors for one or more third-party applications.

In one or more embodiments, the connector management system 906 can determine to recommend the connector 212 based on one or more attributes of the user associated with the user account 200. For example, the connector management system 906 can recommend the connector 212 based on the role, department, position, seniority, etc., of the user associated with the user account 200. To further illustrate, the connector management system 906 can recommend the connector 212 for an image drafting application (e.g., AutoCAD) based on the user account belonging to an engineering group.

Figure 3:
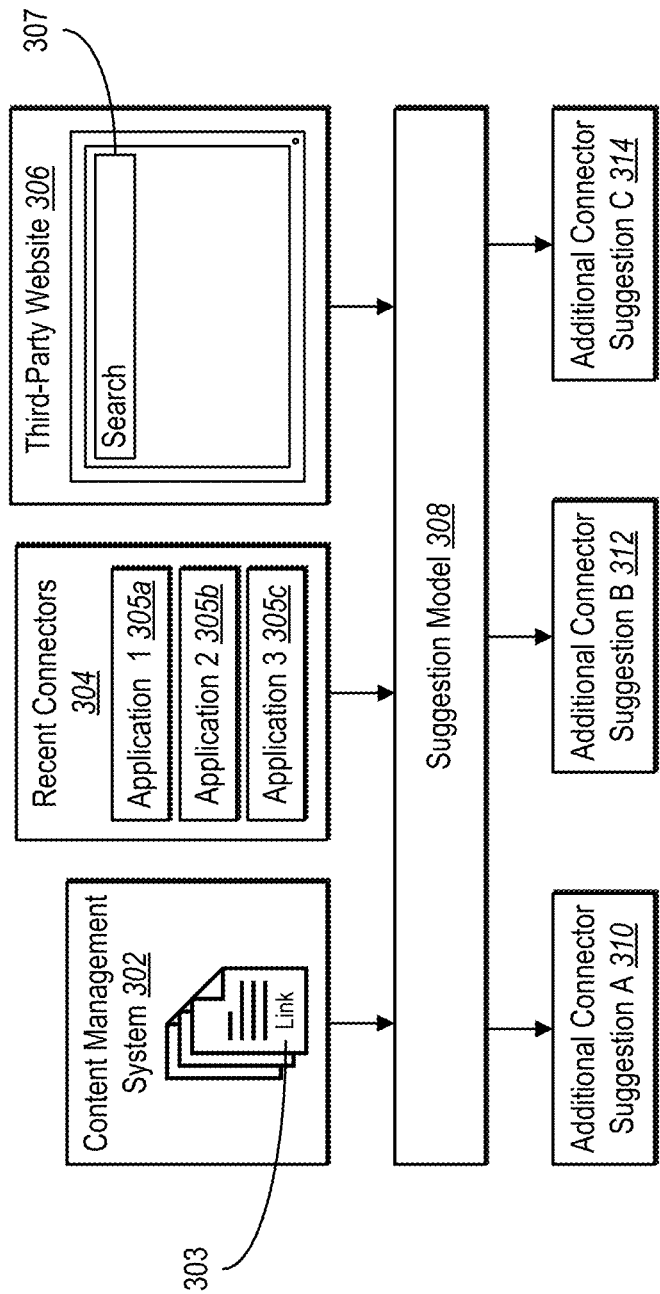
FIG. 3 illustrates a connector management system generating additional connector suggestions by utilizing a suggestion model in accordance with one or more embodiments.

As just indicated, the connector management system 906 can utilize browsing data and/or local device data to determine whether to provide for display on a client device a selectable connector suggestion for a third-party application that is not communicatively linked to a content management system. FIG. 3 illustrates a connector management system 906 generating additional connector suggestions by utilizing a suggestion model in accordance with one or more embodiments. As indicated in FIG. 3, a content management system 302 can store and/or manage one or more content items associated with a user account. In some cases, the connector management system 906 can detect an embedding 303 associated with a third-party application (or additional third-party application) within a content item housed by the content management system 302. For example, the embedding 303 can be a link (or hyperlink) to a content item stored on an additional third-party application and/or a website associated with the additional third-party application. Based on the embedding 303, the connector management system 906 can utilize a suggestion model 308 to suggest an additional connector suggestion A 310 that corresponds to the additional third-party application associated with the embedding 303. For example, in some embodiments, the connector management system 906 can receive and/or detect one or more indications of a selection of the embedding 303 from the client device associated with the user account.

Moreover, the suggestion model 308 can analyze the one or more detected indications of the selection of the embedding 303 and suggest the additional connector suggestion A 310. In some cases, the connector management system 906 can determine if multiple content items associated with the user account contain one or more embeddings to an additional third-party application an suggest the additional connector suggestion A 310.

As further indicated in FIG. 3, the connector management system 906 can detect or recognize recently added connectors (e.g., recent connectors 304) corresponding to one or more third-party applications 305a-c. In some cases, the connector management system 906 can input the recent connectors 304 into the suggestion model 308 which can generate an additional connector suggestion B 312. For instance, in one or more embodiments, the connector management system 906 can identify one or more additional third-party applications related to the one or more third-party applications 305a-c corresponding to the recent connectors 304. For example, the connector management system 906 can determine that the additional connector suggestion B 312 relates to the recent connectors 304 based on the functions of the recent connectors 304. To further illustrate, based on the third-party application 305b relating to productivity, the suggestion model 308 can generate the additional connector suggestion B 312 for an additional third-party application relating to time management. Indeed, in some embodiments, the connector management system 906 can utilize the suggestion model 308 to determine one or more additional connector suggestions that enhance the functions and/or purpose of the one or more third-party applications 305a-c corresponding to recent connectors 304.

In one or more embodiments, the connector management system 906 can generate an additional connector suggestion based on existing connections. For example, based on the user account having connections with certain third-party applications, the connector management system 906 can utilize the suggestion model 308 to determine additional connector suggestions for an additional third-party application that the user account is most likely to link to the content management system. To illustrate, based on the user account linking Microsoft Word and Microsoft Excel to the content management system, the suggestion model 308 can generate an additional connector suggestion for Microsoft Teams. Indeed, the connector management system 906 can utilize existing connections linking third-party applications to the content management system to determine one or more additional connector suggestions that appeal to the user account.

Relatedly, the connector management system 906 can generate an additional connector suggestion based on the popularity, volume usage, and/or reliance of the user account 200 on one or more existing connections. For example, the connector management system 906 can detect which third-party applications connected to the content management system the user account 200 accesses most often and/or regularly. In one or more cases, based on the high-volume usage of some existing third-party applications linked to the content management system, the connector management system 906 can recommend one or more additional connector suggestions to one or more third-party applications. For example, based on the connector management system 906 detecting that the user account utilizes and/or interacts most often with an accounting application linked to the content management system, the connector management system 906 can recommend a banking application to link to the content management system. In some instances, the connector management system 906 can analyze the high-volume third-party applications with the suggestion model 308 to recommend additional connector suggestions. Additionally, in some instances, the connector management system 906 can utilize rule-based or heuristic approaches to recommend one or more third-party applications to link to the content management system via one or more connectors. Indeed, the connector management system 906 can utilize popular third-party applications linked to the content management system to recommend one or more additional connector suggestions that are relevant, useful, and/or helpful for the user account.

In one or more embodiments, based on the recent connectors 304, the connector management system 906, via the suggestion model 308, can determine the goals, intent, and/or purpose of the user associated with the user account and determine one or more additional third-party applications to aid the user in achieving their goals, intent, and/or purpose. For example, in some cases, the suggestion model 308 can generate a third-party relevance prediction for the additional connector suggestion B 312 based on the recent connectors 304.

In some cases, the connector management system 906 can detect a search 307 (or query) related to a third-party website 306 associated with a third-party application. For example, the connector management system 906 can detect, via the web extension, the search 307 for the third-party website 306 and/or the search 307 for a content item accessed via the third-party website 306 associated with the third-party application. Moreover, as discussed above, in some cases, the connector management system 906 can identify the content (e.g., text) of the search 307 and/or the identity or function of the third-party application associated with the third-party website 306. In some cases, based on the suggestion model 308 analyzing the search 307 and/or identity of the third-party application associated with the third-party website 306, the connector management system 906 can generate an additional connector suggestion C 314 that corresponds to the third-party application associated with the third-party website 306. For example, the connector management system 906 can detect the search 307 for a content item on the third-party website by detecting the tab visits and/or third-party web application associated with a project management application (e.g., Jira) and identify the project management application. In one or more cases, the connector management system 906 can input the identity of the project management application and the search 307 into the suggestion model 308. As described above in FIG. 2, the suggestion model 308 can generate a third-party relevance prediction and generate the additional connector suggestion C 314 for the project management application based on the third-party relevance prediction.

Figure 4:
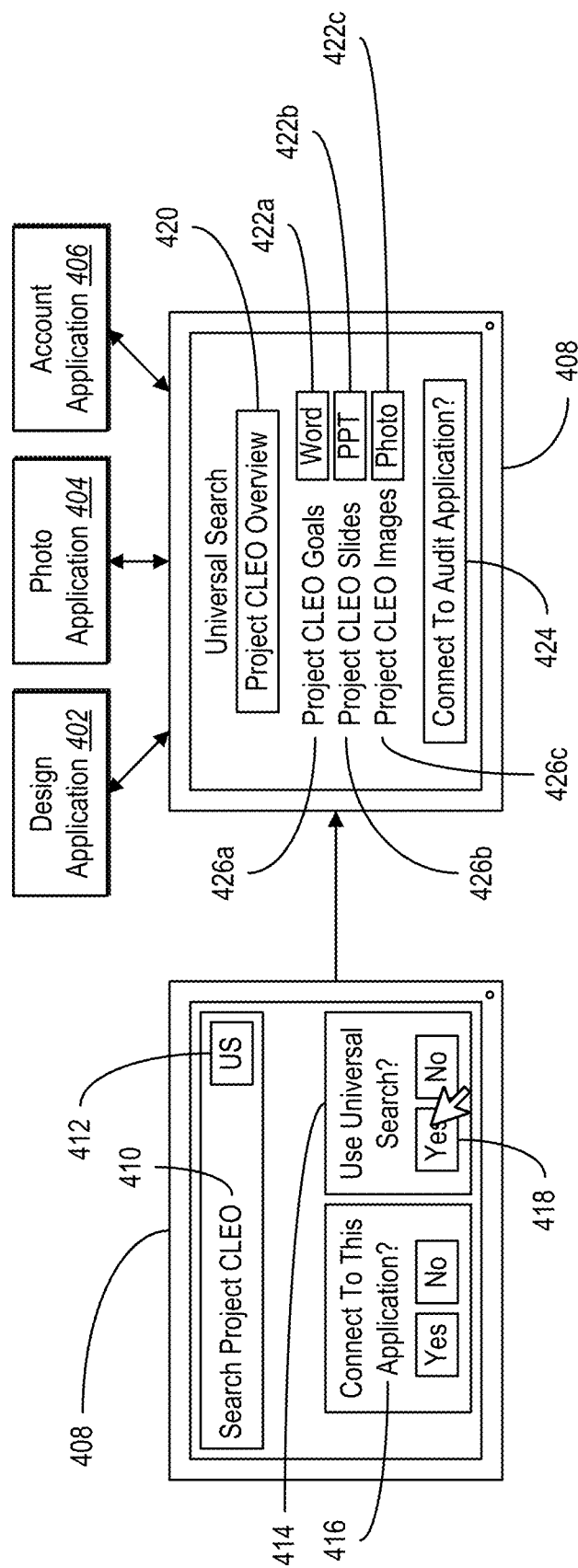
FIG. 4 illustrates exemplary graphical user interfaces of a connector management system providing for display on a client device one or more notifications related to a selectable connector suggestion, a universal search bar, and/or results related to a universal search query in accordance with one or more embodiments.

As just indicated, the connector management system 906 can utilize various aspects of browsing data on web-applications, websites, and/or local device data to determine whether to generate and/or surface selectable connector suggestions related to third-party applications that are external and not linked to a content management system. In some cases, the connector management system 906 can generate various notifications that include selectable connector suggestions and/or suggest utilization of a universal (or unified) search within a content management system. FIG. 4 illustrates exemplary graphical user interfaces of the connector management system 906 providing for display on a client device one or more notifications related to selectable connector suggestion, a universal search bar, and/or results related to a universal search query in accordance with one or more embodiments.

As shown in FIG. 4, the connector management system 906 can detect from a client device 408 a search 410, query, or prompt within a search bar of a third-party application (via a website or web application). In one or more embodiments, once the connector management system 906 detects the search 410 within the search bar, the connector management system 906 can generate a notification 416 with a selectable connector suggestion asking if the user associated with the user account would like to link the recently searched and/or accessed third-party application with the user account on the content management system. As discussed above, based on receiving an indication of a selection of the selectable connector suggestion (or yes element), the connector management system 906 can generate a digital connection linking the recently searched and/or accessed third-party application with the user account. In some embodiments, the notification 416 can include the benefits of connecting the third-party application to the content management system.

Additionally, in some cases, when the connector management system 906 detects the search 410 associated with the third-party application (via a website or web application), the connector management system 906 can provide for display a notification 414 suggesting that the user account perform the search with a universal (or unified) search across one or more linked third-party applications along with a selectable yes element 418. As shown in FIG. 4, based on receiving a selection of the selectable yes element 418, the connector management system 906 can provide for display a unified search window with results comprising information, data, and/or one or more content items from different sources (e.g., third-party systems) communicatively linked to the content management system through digital connections. For example, as shown in FIG. 4, the connector management system 906 can perform the search 410 across a design application 402, a photo application 404, and an account application 406 linked to the user account on the content management system via connectors. In some cases, as indicated in FIG. 4, the connector management system 906 can provide for display a search result comprising one or more content items 426a-c along with source indicators 422a-422c reflecting which third-party application houses and/or sourced the content items 426a-c. For example, as shown in FIG. 4, the connector management system 906 pulled the source content item 426c (e.g., Project CLEO images) from the photo application 404, as indicated by the source indicator 422c. Indeed, the connector management system 906 can indicate the usefulness and increased power of generating connections between third-party applications and the content management system.

In one or more embodiments, the connector management system 906 can access the browsing data (e.g., browsing data 204) to generate search results. For example, based on receiving a search request, the connector management system 906 accesses the browsing data for a user account and identifies one or more search results within the browsing data that matches the search request. For example, the connector management system 906 can parse a URL string (e.g., to identify key words), a date range, or other portions of browsing data to identify a search result for the search request. The connector management system 906 can then provide the search result for display in the list of search results with a source indicator indicating the source of the result. For example, the user may provide "project 1" as a search query, and the connector management system 906 can identify within the browsing history of the user account a URL that matches the search query, (e.g., app-name.com/project1). The connector management system 906 can then provide the URL as a search result with a source indicator of "app-name" next to the search result. In some cases, the user could use the URL to directly access the content on the third-party application via a web-browser (e.g., the user is already logged into the third-party web application or would need to log into the third-party web application). Additionally, the connector management system 906 can determine that the user account does not have a current connection with the third-party application and can provide a selectable connection suggestion proximate to the search result that, based on a user selecting the connection suggestion, allows the connector management system 906 to generate a connection between the user account to the third-party application, as described above.

In some cases, the connector management system 906 can replace the search bar from the third-party application with a universal search bar that can perform a universal (or unified) search across one or more third-party applications linked to the content management system. In some embodiments, the connector management system 906 can receive universal search characters 412 that replace the search bar with a universal search bar. For example, based on detecting the universal search characters 412 of "US," the connector management system 906 would convert the search bar from the third-party application to the universal search bar. In one or more embodiments, the connector management system 906 can provide for display a selectable element suggesting universal search. In one or more cases, based on receiving a selection of the selectable element suggesting universal search, the connector management system 906 can replace the search bar of the third-party application with the universal search bar.

As just discussed, in one or more implementations, the connector management system 906 can suggest a universal (or unified) search that accesses content items stored across various third-party applications linked to the content management system. In some cases, the connector management system 906 can generate, via the universal (or unified) search, a modified search 420 that includes search results tailored to the user account. For example, in one or more embodiments, the modified search 420 can include a modified search query (or search query suggestion) that pulls one or more content items 426a-c from one or more third-party applications 402, 404, 406 that are relevant to the user account. For example, in some cases, the connector management system 906 can pull a set (or string) of recently utilized terms or keywords received from the client device of the user account.

Moreover, in one or more implementations, the connector management system 906 can generate and perform the modified search query with the set of keywords and generate a search result with one or more content items from multiple third-party applications linked to the content management system. In some cases, the content items are ranked based on the user account and/or connectors. For example, the connector management system 906 can provide the one or more content items 426a-c in a ranked order based on the relevance of the third-party application linked to the content management system. In some cases, the connector management system 906 can utilize browser history and/or third-party application history to rank and/or boost content items pulled in response to receiving the modified search query (or search query) from the client device 408 of the user account. In one or more implementations, ranking content items utilizing a unified search is as described by Devin Mancuso et al. in U.S. patent application Ser. No. 18/815,619, titled PERFORMING UNIFIED SEARCH USING A HYBRID SEARCH INDEX filed Aug. 26, 2024. As mentioned above and shown in FIG. 4, the connector management system 906 can provide for display an additional selectable connector suggestion 424 based on the browsing history, the search 410, the modified search 420, and/or the content items 426a-c within the search result.

Additionally, in one or more cases, based on receiving an indication of a selection of a selectable connector suggestion (or additional selectable connector suggestion), the connector management system 906 can generate a digital connection between the newly linked third-party application and the content management system. In some implementations, upon generating the digital connection between the recently linked third-party application, the connector management system 906 can perform the search 410 or an additional search that accesses the content items stored within and/or accessed through the recently linked third-party application. For example, based on receiving an indication of a selection of the additional selectable connector suggestion 424, the connector management system 906 can perform the search 410 and/or modified search 420 for "Project CLEO" and include searching the content items related to "Project Cleo" within the audit application and provide relevant content items from the audit application with the search result.

In some embodiments, the graphical user interface of the client device can provide for display a selectable existing connectors element that can inform the user account of one or more third-party applications that are linked to the content management system. In one or more embodiments, based on receiving an indication of a selection of the selectable existing connectors element, the connector management system 906 can provide for display a tab, pane, and/or window showing a list of existing connections between one or more third-party applications and the user account of the content management system. In some cases, the list of existing connections can show recently used and/or accessed third-party applications linked to the content management system. In one or more embodiments, the list of existing connections between the third-party applications linked to the content management system can be ranked according to utilization and/or relevance to the user account. In some cases, the list of existing connections can include information about re-authenticating credentials to maintain the digital connection between the third-party application and the user account of the content management system. For example, if the authentication token for a given third-party application expires, the connector management system 906 can provide for display an element and/or notification indicating that access to the third-party application has expired.

Selectable Connector Suggestions for an Entity

Figure 5:
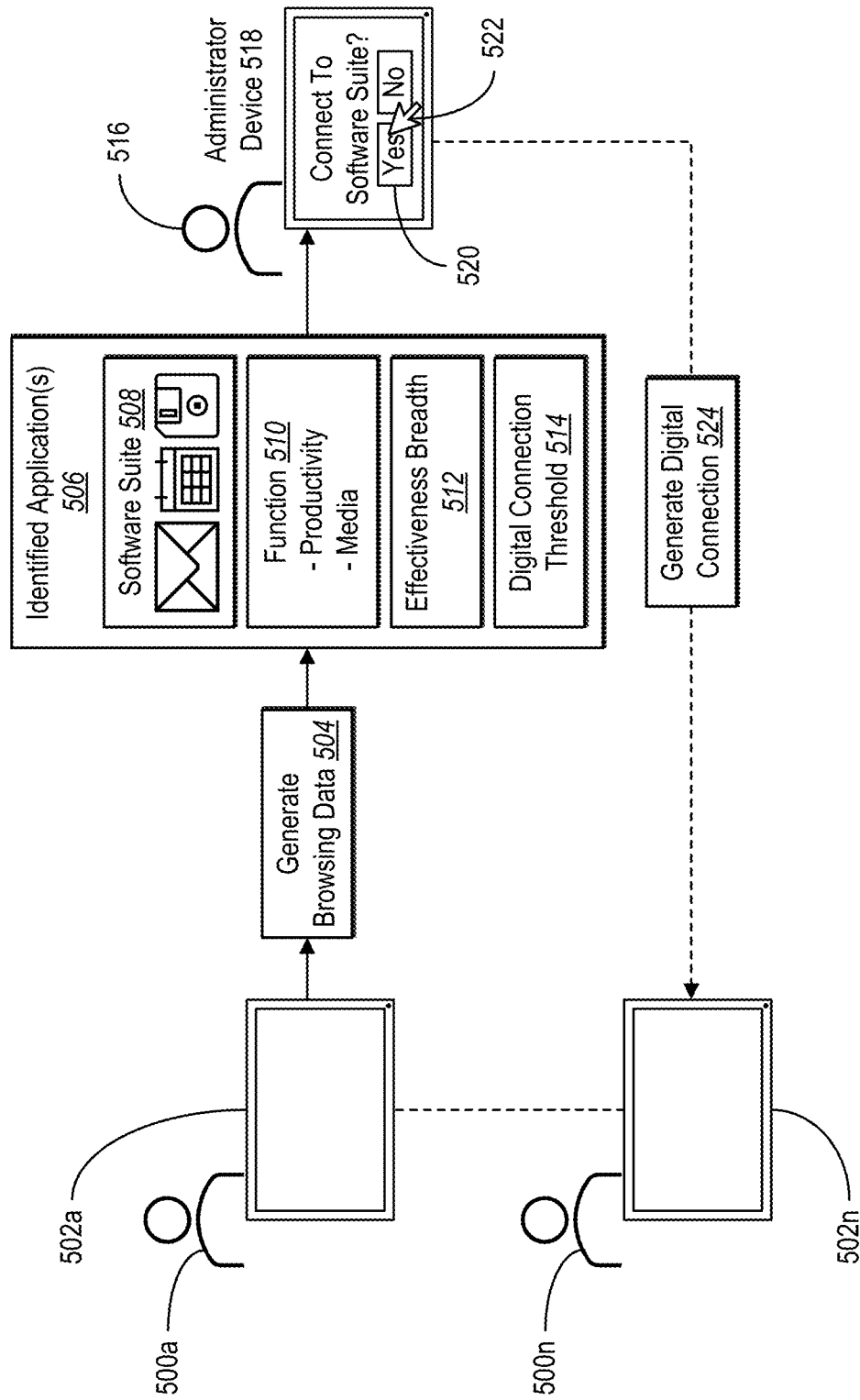
FIG. 5 illustrates a connector management system utilizing collective browsing data from one or more devices to identify one or more third-party applications and generate one or more digital connections based on detecting an administrator device selecting a selectable connector suggestion in accordance with one or more embodiments.

As discussed above, the connector management system 906 can provide for display one or more selectable connector suggestions for an individual user account. In some cases, the connector management system 906 can utilize collective browsing data from several user accounts within an entity and generate one or more selectable connector suggestions corresponding to one or more third-party applications that link and/or expand the searching corpus (or hybrid search index) of user accounts within the entity. FIG. 5 illustrates a connector management system utilizing collective browsing data from one or more devices to identify one or more third-party applications and generate one or more digital connections based on detecting an administrator device selecting a selectable connector suggestion in accordance with one or more embodiments.

As shown in FIG. 5, the connector management system 906 can gather and identify collective browsing data and/or local device data corresponding to collective browsing activity associated with one or more user accounts 500a-n on one or more client devices 502a-n within an entity (e.g., organization). In particular, the connector management system 906 can detect, log, and/or monitor one or more user interactions, navigations, accesses, etc., with one or more web-applications, websites, and/or desktop applications from the user accounts 500a-n. Indeed, as shown in FIG. 5, the connector management system 906 can generate browsing data 504 (or identify browsing data) and/or local device data associated with the user accounts 500a-n on the one or more client devices 502a-n. In some cases, the connector management system 906 can determine the most popular (or accessed) websites, web applications, and/or desktop applications for the user accounts 500a-n within the entity, department, group, and/or organization. As discussed above, the connector management system 906 can utilize the suggestion model to determine whether to provide for display on the administrator device 518 associated with the administrative user account 516 one or more selectable connector suggestions. Relatedly, the connector management system 906 can provide for display on the administrator device 518 associated with the administrative user account 516 one or more selectable connector suggestions based on one or more rules as described above in FIGS.

In one or more embodiments, the connector management system 906 can identify for the user accounts 500a-n within an organization (e.g., entity) one or more third-party applications to connect to the content management system based on the collective browsing data and/or collective local device data. For example, the collective browsing data and/or collective local device data can reflect the interests, needs, actions, goals, functions, preferences, tools, tasks, etc. of the user accounts 500a-n within an organization (e.g., entity). To illustrate, the collective browsing data can show which websites and/or web applications the user accounts 500a-n access and/or utilize to perform certain tasks. In some cases, the connector management system 906 can collect collective browsing data for a set of user accounts associated with a department, role, position, etc., within the entity.

In some cases, the connector management system 906 can identify one or more third-party applications relevant to the user accounts 500a-n that serve, fulfill, and/or accomplish the interests, needs, functions, tasks, etc., of the user accounts 500a-n within an organization (e.g., entity) based on analyzing the collective browsing data and/or the collective local device data. In one or more embodiments, the connector management system 906 can utilize the suggestion model as described above in FIGS. 2-3 to analyze the collective browsing data and/or collective local device data to generate one or more third-party relevance predictions for one or more third-party applications. In some cases, based on the third-party relevance score the connector management system 906 can provide for display on the 518 associated with the administrative user account 516 one or more selectable connector suggestions. Indeed, the connector management system 906 can identify for a subset of user accounts with a specific role and/or within a specific department one or more selectable connector suggestions for one or more third-party applications that help the subset of user accounts fulfill their specific role and/or function within the specific department As shown in FIG. 5, the identified application(s) 506 can include a software suite 508 comprising a bundle (or set) of third-party applications. In one or more embodiments, the software suite 508 can include bundles of third-party applications that interconnect and easily share data (e.g., source content items) in a collaborative manner. For example, the software suite 508 can be Microsoft Office comprising Word, Excel, PowerPoint, and Outlook or LibreOffice comprising Writer, Calc and Impress. In some cases, the bundle of third-party applications making up the software suite 508 can be based on the developer, needs of target audience, or functions of the bundle of third-party applications. For example, the software suite 508 can include a bundle of third-party applications related to creative projects (e.g., Photoshop and Illustrator). In one or more embodiments, the connector management system 906 can determine, from the collective browsing data and/or collective local device data that a majority of the user accounts 500*a-n* access and/or utilize websites and/or web applications corresponding to the third-party applications. Based on the collective browsing data and/or collective local device data, the connector management system 906 can suggest the software suite 508 and generate a set of digital connections (or links) between the set of third-party applications making up the software suite and the user account on the content management system.

In some cases, the software suite 508 can generate a bundle of third-party applications for various levels of granularity within the entity. For instance, in some cases, the connector management system 906 can suggest the software suite 508 for user accounts 500*a-n* within a group, a department, or the entity. To illustrate, in some cases, the connector management system 906 can suggest the software suite 508 comprising an email application, scheduling application, and document application for all of the user accounts 500*a-n* within the entity.

As mentioned, the connector management system 906 can suggest the software suite 508 for a department and/or a group based on the collective browsing data and/or collective local device data, features, needs, preferences, etc., of the department and/or the group. For example, in some implementations, the connector management system 906 can gather collective browsing data and/or collective local device data for the user accounts 500*a-n* within the department and/or the group and identify the software suite 508 with a bundle of third-party applications that would be useful and/or relevant to the user accounts 500*a-n* within the department and/or group. In some cases, the connector management system 906 can identify one or more third-party applications by analyzing the collective browsing history with the suggestion model described above.

As further shown in FIG. 5, the connector management system 906 can identify and suggest linking a third-party application to the user accounts 500*a-n* of the entity based on a function 510 of the third-party application. For example, the function 510 of the third-party application can relate to image editing, productivity, media creation, auditing, charting, security management, project management, task organization, video conferencing, etc. Indeed, based on the interests or features of user accounts 500*a-n* within the entity as indicated by the collective browsing data and/or collective local device data, the connector management system 906 can identify third-party applications with functions that if linked to the user accounts 500*a-n*, would improve the productivity of the entity and/or target the context or functions regarding the work, tasks, or needs of the entity and the associated user accounts 500*a-n*. For example, based on the collective browsing data and/or collective local device data, the connector management system 906 can identify one or more third-party applications that improve productivity for the user accounts 500*a-n* entity-wide or on a department-wise basis. For instance, in some cases, the connector management system 906 can generate a selectable connector suggestion for forming a digital connection between a third-party team communication application (e.g., Slack) and the content management system for the user accounts 500*a-n* entity-wide.

As mentioned above, the connector management system 906 can identify third-party applications for a group of user accounts and/or a department. For instance, in some cases, the connector management system 906 can identify a subset of user accounts belonging to a content editing department. In one or more cases, the connector management system 906 can gather collective browsing data and/or collective local device data for the subset of user accounts within the content editing department. The connector management system 906 can identify a third-party application related to media (or image) editing based on the collective browsing data and/or collective local device data for the subset of user accounts within the content editing department showing the subset of user accounts accessing and/or utilizing a website (e.g., opening a window or tab associated with the website), web application, and/or third-party desktop application related to the third-party application that enables media (or image) editing.

In some cases, the identified application(s) 506 can include third-party applications that meet an effectiveness 512 where the content management system is linked to a specific number and/or type of third-party applications. For instance, the effectiveness breadth 512 can reflect the range of functions and/or the scope of access to data (e.g., content items) for a user account 500*a* that links the specific number and/or type of third-party applications to the content management system. As discussed above, based on the collective browsing data and/or collective local device data for the user accounts 500*a-n* and/or a subset of user accounts, the connector management system 906 can determine one or more third-party applications that if linked, would expand and synchronize the knowledge base (or hybrid search index) of the user accounts 500*a-n* and/or subset of user accounts. In one or more implementations, a hybrid search index is as described by Devin Mancuso et al. in U.S. patent application Ser. No. 18/815,606 titled GENERATING A HYBRID SEARCH INDEX FOR UNIFIED SEARCH filed Aug. 26, 2024.

In some cases, the identified applications can include one or more third-party applications to reach a digital connection threshold 514. For example, the connector management system 906 can set the digital connection threshold 514 dictating having a certain number of digital connections (or digital connectors) corresponding to the third-party applications linked to the user account of the content management system. To illustrate, the connector management system 906 can set the digital connection threshold 514 at three digital connections linking three third-party applications to the content management system for the user accounts 500*a-n*. As described above, the connector management system 906 can utilize the collective browsing data and/or collective local device data for the user accounts 500*a-n* to determine which three third-party applications the connector management system 906 should suggest via selectable connector suggestions corresponding to the three third-party applications. In some cases, the connector management system 906 can receive one or more user inputs from an administrator device 518 defining the digital connection threshold 514 for the user accounts 500a-n within the entity and/or a subset of user accounts within a department or associated with a group of user accounts.

As further shown in FIG. 5, the connector management system 906 can provide for display on a graphical user interface of an administrator device 518 (or client device) associated with an administrative user account 516, one or more selectable connector suggestions (or additional selectable connector suggestions) corresponding to one or more of the identified application(s) 506. For example, the connector management system 906 can provide for display on the administrator device 518, a selectable connector suggestion 520 (or selectable suite connector suggestion) for the software suite 508. In one or more embodiments, the selectable suite connector suggestion can show which third-party applications within the software suite 508 will link to the user accounts 500a-n on the content management system via the digital connection.

In some cases, the connector management system 906 can provide for display one or more of the identified application(s) 506 specific to a department to an administrator device 518 associated with an administrative user account 516 for the department and/or group. For example, in some cases, the connector management system 906 can provide for display on the graphical user interface of an administrative device (or client device) of a director of the finance department one or more selectable connector suggestions for one or more identified application(s) for a group of user accounts within the finance department 506. Relatedly, the connector management system 906 can receive from the administrative device (or client device) of a director of the finance department one or more indications of a selection of the one or more selectable connector suggestions for one or more identified application(s) for a group of user accounts within the finance department 506.

As shown in FIG. 5, upon detecting a selection 522 (or indication of selection) of the selectable connector suggestion 520, the connector management system 906 can generate a digital connection 524 (e.g., shared digital connection) or one or more digital connections that communicatively link the one or more third-party applications from the identified application(s) 506 with the one or more user accounts 500a-n within the entity. For example, the connector management system 906 can generate a connector (e.g., digital connection) for each of the user accounts 500a-n within the entity or within a group of user accounts. In some embodiments, the connector management system 906 can generate a shared digital connection (or shared connector) between a group (or department) of user accounts and the third-party application. In some cases, the connector management system 906 can apply the shared connector to a subset of user accounts that belong to the group (or department). In some cases, the connector management system 906 can form one or more shared connectors between one or more linked third-party applications and provide the subset of user accounts access to the content items stored on the third-party applications.

Indeed, receiving an indication of a selection of one or more selectable connector suggestions from the administrator account 516 can provide access to all of the content items associated with the entity from linked third-party applications. In some embodiments, the connector management system 906 can limit access to certain content items, data, and/or information based on the permissions, roles, and/or identification of user accounts within the entity. In some cases, the connector management system 906 can receive one or more user inputs from the administrator device 518 associated with the administrative user account 516, defining which user accounts can access certain content items. Thus, the connector management system 906 can communicatively link one or more relevant, helpful, and/or useful third-party applications to the content management system for multiple user accounts, groups of user accounts, and/or entity-wide.

While FIG. 5 illustrates the connector management system 906 providing for display on the administrator device 518 of the administrative user account 516 one or more selectable connector suggestions for the identified application(s) 506, the connector management system 906 can provide for display on the client device of a user account, one or more selectable connector suggestions corresponding to a bundle of third-party applications within the software suite 508 and/or one or more third-party applications based on the function 510 of the third-party applications. Additionally, the connector management system 906 can provide for display on the client device of a user account one or more selectable connector suggestions so that the user account reaches the effectiveness breadth 512 and/or the digital connection threshold 514.

Figure 6:
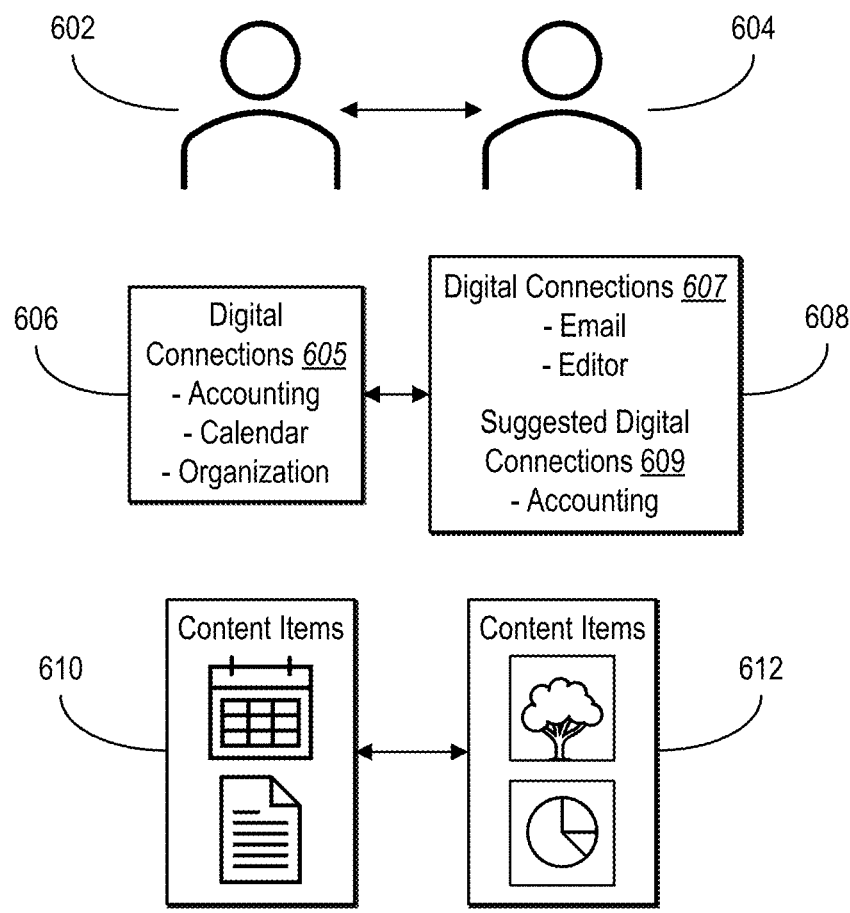
FIG. 6 illustrates a connector management system utilizing relationships between user accounts, digital connections, and/or content items to generate or provide for display one or more additional selectable connector suggestions on a client device in accordance with one or more embodiments.

As just mentioned, the connector management system 906 can generate multiple digital connections for multiple user accounts associated with an entity by detecting an indication of a selection of one or more selectable connector suggestions from an administrator device (or client device) associated with an administrative user. In some embodiments, the connector management system 906 can utilize additional information to determine which selectable connector suggestions should be provided for display on a client device associated with an administrative user. FIG. 6 illustrates a connector management system 906 utilizing relationships between user accounts, digital connections, and/or content items to generate or provide for display one or more additional selectable connector suggestions on an administrator device (or client device) in accordance with one or more embodiments.

As shown in FIG. 6, the connector management system 906 can utilize user accounts 602, 604, digital connections 605, 607, and/or content items 610, 612 to provide for display one or more selectable connector suggestions to one or more user accounts within an entity. For example, as indicated in FIG. 6, the connector management system 906 can generate and/or utilize a relationship graph, an organizational chart, or groupings showing the connections, collaborations, and/or associations between user accounts 602, 604, digital connections 605, 607 and/or content items 610, 612. In some cases, the relationship graph can include relationships between groups of user accounts, departments, locations, etc., within the entity. In one or more embodiments, the connector management system 906 can utilize the relationship graph, an organizational chart, or groupings to determine one or more suggested digital connections for one or more user accounts. In some cases, the suggestion model as described above can analyze the relationship graph, an organizational chart, and/or groupings to determine the one or more suggested digital connections for one or more user accounts.

As shown in FIG. 6, in some cases, the connector management system 906 can determine one or more suggested digital connections 609 based on the relationships between the user accounts 602, 604, the digital connections 605, 607, and/or the content items 610, 612. For example, the connector management system 906 can determine that the user account 602 accesses and utilizes a linked accounting application. Moreover, based on the user account 602 collaborating with the user account 604, the connector management system 906 can suggest the accounting application to the user account 604 by providing for display a selectable connector suggestion corresponding to the accounting application.

In some cases, the user account 602 and the user account 604 can share certain attributes, such as sharing the same role, department, seniority, etc., in one or more embodiments, the connector management system 906 can utilize the shared attributes to suggest a third-party application to link to the content management system with a connector. Indeed, the connector management system 906 can determine the most popular, utilized, helpful, etc., third-party applications linked to the content management system of one or more user accounts closely related (or connected) to the user account 604 and recommend generating a digital connection between those third-party applications and the content management system for the user account 604 by providing for display on the client device selectable connector suggestions for the third-party applications.

As further shown in FIG. 6 and mentioned above, in some cases, the connector management system 906 can utilize relationships between content items 610, 612 to suggest generating a connection between the third-party application and the content management system for the user account. For example, the connector management system 906 can determine (or identify) the type, source, theme, topic, content, etc., of one or more content items (i) stored within the content management system, (i) stored within one or more third-party applications linked to the user account of the content management system, and/or (iii) accessed by the client device on the website (or web application) associated with the third-party application. For example, the connector management system 906 can identify the topic of the content items 610 generated, accessed, and/or utilized by the user account 602 and stored within a third-party application linked to the user account of the content management system. In some cases, the connector management system 906 can identify the topic and/or type of the content items 612 generated, accessed, and/or utilized by the user account 604 on a website (or web application) via the web extension that corresponds to a third-party application that is not linked to the user account of the content management system. Based on the topic and/or type of the content items 610 matching and/or relating to the topic and/or type of the content items 612, the connector management system 906 can provide for display a selectable connector suggestion on the client device of the user account 604, suggesting the user account 604 link the third-party application to the content management system.

Figure 7:
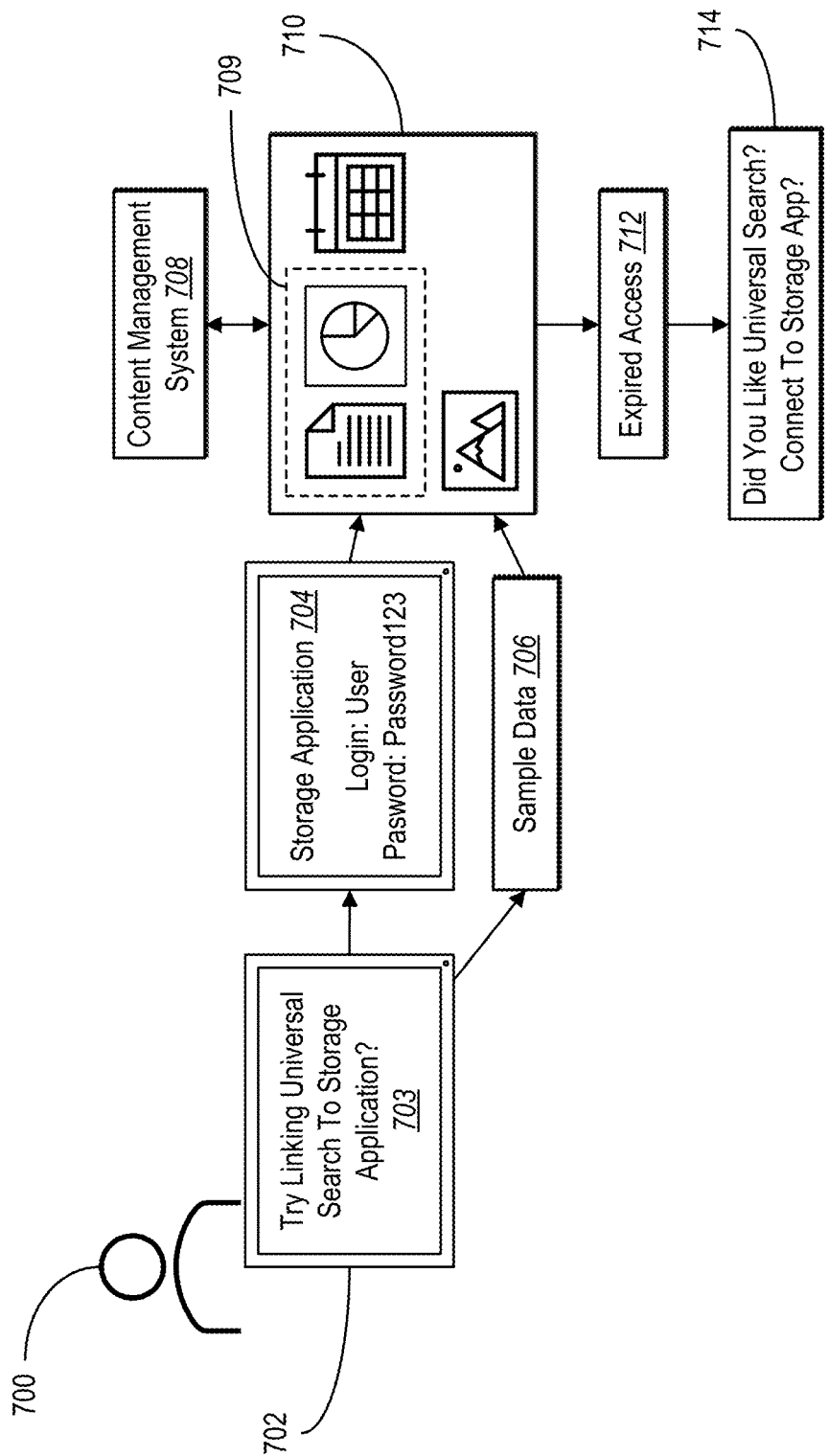
FIG. 7 illustrates a connector management system generating and utilizing a temporary digital connection between a third-party application and a content management system in accordance with one or more embodiments.

Generating Temporary Digital Connections Linking Third-Party Applications to the Content Management System In some embodiments, the connector management system 906 allows a user account to preview the benefits, efficiencies, and flexibilities of linking third-party applications with the user account on the content management system. FIG. 7 illustrates a connector management system generating and utilizing a temporary digital connection between a third-party application and a content management system in accordance with one or more embodiments.

As shown in FIG. 7, the connector management system 906 can provide for display on a client device 702 associated with a user account 700 a notification 703 to try a universal (or unified) search. As shown in FIG. 7, in one or more embodiments, the connector management system 906 can receive limited and/or temporary access to a subset of data, content items, and/or information on the third-party application via a limited and/or temporary digital connection between the third-party application and the user account 700 of the content management system 708. For example, as FIG. 7 illustrates in response to receiving one or more user inputs indicating testing the universal search, the connector management system 906 can request authentication credentials for the storage application 704. As shown in FIG. 7 the connector management system 906 can receive authentication credentials to the storage application 704 that is not yet linked to the user account 700 of the content management system 708. In one or more embodiments, the connector management system 906 can receive one or more additional authentication credentials corresponding to one or more additional third-party applications that can be temporarily linked (or connected) to the content management system 708.

As further shown in FIG. 7, upon receiving the authentication credentials, the connector management system 906 receives temporary and/or limited access to a subset of content items 709 stored on the storage application 704. In some cases, the connector management system 906 determines the subset of items 709 based on one or more factors associated with the subset of content items 709. In some cases, the one or more factors can include the generation date, access date (or time) from the user account, edit dates (or time) by the user account, size, type, location, etc. For example, in one or more cases, the connector management system 906 can receive temporary access to the ten most recently generated, accessed, and/or edited content items (e.g., the subset of content items 709) associated with the user account on the storage application 704 (or third-party application). In some embodiments, the connector management system 906 can receive user input indicating which content items should be included in the subset of content items 709. For example, the connector management system 906 can receive user input, allowing access to a group of file folders stored on the third-party application comprising the subset of content items 709. In some cases, the connector management system 906 can receive temporary access to data related to the subset of content items 709 for a given time period (or limited period of time). For example, the connector management system 906 can temporarily connect data associated with the subset of content items 709 (or all content items) generated for a given day (or week) within the storage application 704 (or third-party application) to the user account 700 on the content management system.

Additionally, the connector management system 906 can generate a temporary digital connection between the user account 700 on the content management system 708 and the storage application 704. In some cases, the connector management system 906 can generate one or more temporary digital connections between the user account 700 on the content management system 708 and one or more additional third-party applications temporarily linked to the content management system 708. In some embodiments, the temporary access from the temporary digital connection can include linking all content items in the storage application 704 for a limited amount of time. For example, the temporary digital connection can provide access to the content items in the storage application 704 and/or one or more additional third-party applications for an hour. IN some cases, the connector management system 906 can receive user input indicating the limited amount of time of access. For example, the connector management system 906 can receive user input authorizing temporary access between the content management system 708 and the storage application 704 and/or one or more additional third-party applications for three hours.

Additionally, in some cases, the connector management system 906 can maintain the temporary digital connection between the storage application 704 and the content management system 708 for a number of performed actions (or search queries) received from the user account 700. For example, the connector management system 906 can provide (or maintain) temporary access to the content items on the storage application 704 and/or (one or more additional third-party applications) for five search queries.

Moreover, in some cases, the connector management system 906 can utilize sample data 706 to simulate searching, generating, and/or accessing content in the universal (or unified) search. For example, the connector management system 906 can generate the sample data 706 comprising content items stored on distinct and/or external third-party applications linked to a sample (or trial) user account on the content management system. In one or more embodiments, the sample data 706 can include one or more source content items collected from one or more additional user accounts within the content management system 708. In some cases, the connector management system 906 can allow the user account to perform a search request with the sample user account. For example, the connector management system 906 can receive a search query from the user account of the sample data 706 and provide for display on the client device 702 a search result comprising one or more content items from various third-party applications to show the benefits of the universal (or unified) search.

In one or more cases, the connector management system 906 can provide for display on the client device of the user account 700 one or more suggested search queries that show the benefits of the universal (or unified search) by pulling content items from various third-party applications. In response to receiving an indication of a selection of the one or more suggested search queries (or a search query) from the client device of the user account 700, the connector management system 906 can provide for display a search result comprising one or more content items pulled from the third-party applications.

As further shown in FIG. 7, the connector management system 906 can detect expired access 712 to the subset of content items 709 and, in response, remove the temporary digital connection between the storage application 704 and the user account 700 on the content management system 708. In one or more cases, the connector management system 906 can detect the expired access 712 based on detecting the expiration of the limited amount of time, receiving an indication of a selection of a selectable access expiry element, and/or detecting the execution of a number of performed actions. For example, if the connector management system 906 maintained a temporary digital connection with the storage application 704 for 15 minutes, the connector management system 906 would detect expired access 712 once 15 minutes elapsed. As indicated above, in one or more embodiments, the connector management system 906 can provide for display on the graphical user interface of the client device 702 the selectable access expiry element for the storage application 704. The connector management system 906 can detect expired access 712 based on receiving the indication of a selection of the selectable access expiry element. In one or more embodiments, based on detecting expired access 712, the connector management system 906 can delete any downloaded or accessed content items while forming the temporary digital connection between the third-party application and the content management system 708.

In some cases, based on the expired access 712, the connector management system 906 can provide for display a notification and/or selectable connector suggestion 714 for establishing a digital connection between the storage application 704 and the user account 700. Indeed, the connector management system 906 can provide for display on the graphical user interface of the client device 702 one or more selectable connector suggestions for one or more third-party applications (or additional third-party applications) temporarily linked to the user account 700 of the content management system 708. In some cases, the one or more selectable connector suggestions can correspond to one or more third-party applications that would be most useful and/or relevant to the user account 700.

FIGS. 1-7, the corresponding text, and the examples provide a number of different systems and methods for generating a digital connection between a content management system and a third-party application based on receiving a selection of a selectable connector suggestion in accordance with one or more embodiments. In addition to the foregoing, implementations can also be described in terms of flowcharts comprising acts steps in a method for accomplishing a particular result. For example, FIG. 8 illustrates an example series of acts for generating a digital connection between a content management system and the third-party application based on receiving a selection of a selectable connector suggestion.

Figure 8:
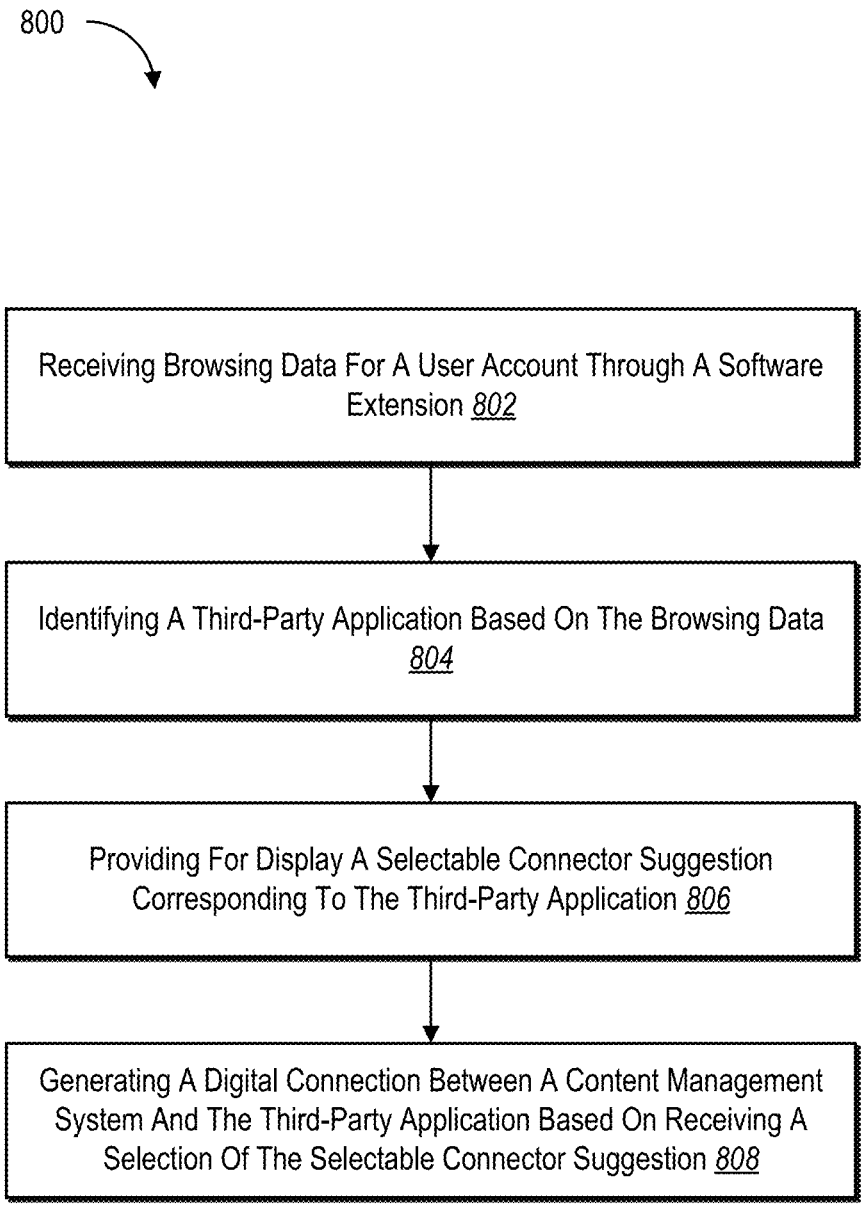
FIG. 8 illustrates a flowchart of a series of acts for providing a selectable connector suggestion for display on a client device in accordance with one or more embodiments.

As illustrated in FIG. 8, the series of acts 800 may include an act 802 of receiving browsing data for a user account through a software extension. For example, in one or more embodiments, the act 802 can include receiving, for a user account on a content management system and via a software extension on a browser application, browsing data corresponding to browsing activity associated with a user associated with the user account. In addition, the series of acts 800 includes an at 804 of identifying a third-party application based on the browsing data. For instance, in one or more implementations, the act 804 includes identifying, from the browsing data, a third-party application that is external to the content management system. Furthermore, in some cases, the series of acts 800 includes an act 806 of providing for display a selectable connector suggestion corresponding to the third-party application. For example, in some cases, the act 806 can include providing for display on a graphical user interface of a client device, a selectable connector suggestion corresponding to the third-party application. As further shown in FIG. 8, the series of acts 800 can include an act 808 of generating a digital connection between a content management system and the third-party application based on receiving a selection of the selectable connector suggestion. For instance, in some implementations, the act 808 can include based on receiving an indication of a selection of the selectable connector suggestion, generating a digital connection that communicatively links the third-party application to the user account on the content management system.

Further, in one or more embodiments, the series of acts 800 includes generating, based on the browsing data, a third-party relevance prediction for the third-party application. Additionally, the series of acts 800 can include based on the third-party relevance prediction, providing the selectable connector suggestion corresponding to the third-party application.

Furthermore, in some implementations, the series of acts 800 includes detecting within a content item stored on the content management system, an embedding associated with an additional third-party application external to the content management system. In one or more embodiments, the series of acts 800 includes providing for display on the graphical user interface of the client device, an additional selectable connector suggestion corresponding to the additional third-party application.

Moreover, in one or more embodiments, the series of acts 800 includes detecting a search query associated with an additional third-party application based on the browsing data. Additionally, the series of acts 800 can include based on the search query associated with the additional third-party application, generating an additional selectable connector suggestion corresponding to the additional third-party application.

Furthermore, in one or more implementations, the series of acts 800 includes receiving, from the client device, temporary access to a subset of content items within the third-party application. Additionally, in some cases, the series of acts 800 includes based on the temporary access, generating a temporary digital connection that communicatively links the subset of content items within third-party application to the user account on the content management system.

In some cases, the series of acts 800 can include identifying a software suite corresponding to a set of third-party applications. Moreover, the series of acts 800 can include providing for display on the graphical user interface of the client device, a selectable suite connector suggestion corresponding to the set of third-party applications. In some embodiments, the series of acts 800 can include based on receiving an additional indication of an additional selection of the selectable suite connector suggestion, generating a set of digital connections that communicatively link the set of third-party applications to the user account on the content management system.

In one or more cases, the series of acts 800 can include identifying collective browsing data corresponding to collective browsing activity associated with a set of users associated with a set of user accounts within an entity. Additionally, the series of acts 800 can include identifying, from the collective browsing data, one or more third-party applications that are external to the content management system. In some implementations, the series of acts 800 can include providing for display on a graphical user interface of a client device associated with an administrative user account, one or more selectable connector suggestions corresponding to the one or more third-party applications. Furthermore, in some embodiments, the series of acts 800 can include based on receiving an additional indication of an additional selection of the one or more selectable connector suggestions from the client device associated with the administrative user account, generating one or more digital connections that communicatively links the one or more third-party applications to the set of user accounts on the content management system.

In one or more cases, the series of acts 800 can include receiving, for a user account on a content management system and via a software extension on a browser application, browsing data corresponding to browsing activity associated with a user associated with the user account. Additionally, the series of acts 800 can include receiving, for the user account on the content management system and via a local content management system application, local browsing data corresponding to local user activity associated with the user associated with the user account. In some implementations, the series of acts 800 can include identifying, from the browsing data and the local browsing data, a third-party application that is external to the content management system. Furthermore, in some embodiments, the series of acts 800 can include providing for display on a graphical user interface of a client device, a selectable connector suggestion corresponding to the third-party application. Additionally, in one or more embodiments, the series of acts 800 can include based on receiving an indication of a selection of the selectable connector suggestion, generating a digital connection that communicatively links the third-party application to the user account on the content management system.

In some cases, the series of acts 800 can include generating based on the browsing data and the local browsing data, a third-party relevance prediction for the third-party application. Additionally, the series of acts 800 can include based on the third-party relevance prediction, providing for display on the graphical user interface of the client device, the selectable connector suggestion corresponding to the third-party application.

In one or more embodiments, the series of acts 800 includes detecting a launch of an additional third-party application external to the content management system from the local content management system application. In some cases, the series of acts 800 can include providing for display on the graphical user interface of the client device, an additional selectable connector suggestion corresponding to the additional third-party application.

Further, in some cases, the series of acts 800 can include receiving, from the client device, temporary access to a subset of content items within the third-party application for a limited period of time. Moreover, in one or more embodiments, the series of acts 800 includes based on the temporary access, generating a temporary digital connection that communicatively links the subset of content items within the third-party application to the user account on the content management system for the limited period of time.

Additionally, in one or more embodiments, the series of acts 800 includes identifying one or more existing digital connections communicatively linking one or more third-party applications to the user account on the content management system. Furthermore, in some cases, the series of acts 800 includes based on the one or more existing digital connections, providing for display on a graphical user interface of a client device, an additional selectable connector suggestion corresponding to an additional third-party application. In one or more cases, the series of acts 800 can include based on receiving an additional indication of a selection of the selectable connector suggestion, generating a digital connection that communicatively links the third-party application to the user account on the content management system.

Furthermore, in some implementations, the series of acts 800 can include identifying collective browsing data corresponding to collective browsing activity associated with a set of users associated with a set of user accounts within an entity. In one or more cases, the series of acts 800 can include identifying, from the collective browsing data, a third-party application that is external to the content management system. In one or more implementations, the series of acts 800 can include providing for display on a graphical user interface of an administrator client device associated with an administrative user account, a selectable connector suggestion corresponding to the third-party application. In some embodiments, the series of acts 800 can include based on receiving an indication of a selection of the selectable connector suggestion from the administrator client device associated with the administrative user account, generating a shared digital connection that communicatively links the third-party application to the set of user accounts on the content management system.

Moreover, in one or more implementations, the series of acts 800 can include receiving, for a user account on a content management system browsing data corresponding to browsing activity associated with a user associated with the user account. In addition, in some cases, the series of acts 800 can include identifying, from the browsing data, a third-party application that is external to the content management system. Furthermore, the series of acts 800 can include providing for display on a graphical user interface of a client device, a selectable connector suggestion corresponding to the third-party application. Further, in one or more implementations, the series of acts 800 can include based on receiving an indication of a selection of the selectable connector suggestion, requesting authentication credentials for the third-party application. Additionally, the series of acts 800 can include based on receiving the authentication credentials, generating a digital connection that communicatively links the third-party application to the user account on the content management system.

Moreover, in some cases, the series of acts 800 includes generating, utilizing a suggestion model, a third-party relevance prediction for the third-party application based on the browsing data. In one or more embodiments, the series of acts 800 can include based on the third-party relevance prediction, providing for display on the graphical user interface of the client device, the selectable connector suggestion corresponding to the third-party application.

Additionally, in one or more embodiments, the series of acts 800 includes determining a digital connection threshold corresponding to a number of digital connections for the user account on the content management system. Moreover, in some cases, the series of acts 800 can include providing for display on the graphical user interface of the client device, one or more additional selectable connector suggestions corresponding to one or more third-party applications to exceed the digital connection threshold.

In one or more embodiments, the series of acts 800 can include generating sample data comprising one or more content items stored on one or more third-party applications communicatively linked the content management system. In some cases, the series of acts 800 can include receiving from the client device associated with the user account a search query of the sample data. Moreover, in one or more implementations, the series of acts 800 can include in response to receiving the search query, providing for display on the client device a search result comprising one or more source content items from the one or more third-party applications.

In some cases, the series of acts 800 can include receiving, from the client device associated with the user account one or more additional authentication credentials for one or more third-party applications external to the content management system. Additionally, in one or more implementations, the series of acts 800 includes based on receiving the one or more additional authentication credentials, generating a temporary digital connection that communicatively links source content items within the one or more third-party applications to the user account on the content management system for a limited period of time.

In one or more embodiments, the series of acts 800 can include identifying collective browsing data corresponding to collective browsing activity associated with a set of users associated with a set of user accounts within an entity. Furthermore, in some embodiments, the series of acts 800 can include identifying, from the collective browsing data, a third-party application that is external to the content management system. In one or more implementations, the series of acts 800 includes providing for display on a graphical user interface of a client device associated with an administrative user account, a selectable connector suggestion corresponding to the third-party application. Additionally, the series of acts 800 can include based on receiving an additional indication of an additional selection of the selectable connector suggestion, generating one or more digital connections that communicatively links the third-party application to the set of user accounts on the content management system.

Moreover, in one or more implementations, the series of acts 800 can include detecting from the browsing data a search query associated with an additional third-party application external to the content management system. Additionally, in some embodiments, the series of acts 800 includes based on the search query associated with the additional third-party application, generating an additional selectable connector suggestion corresponding to the additional third-party application. In one or more implementations, the series of acts 800 includes based on receiving an additional indication of an additional selection of the additional selectable connector suggestion, generating an additional digital connection that communicatively links the third-party application to the user account on the content management system.

In one or more implementations, each of the components of the connector management system 906 are in communication with one another using any suitable communication technologies. Additionally, the components of the connector management system 906 can be in communication with one or more other devices including one or more client devices described above. It will be recognized that in as much the connector management system 906 is shown to be separate in the above description, any of the subcomponents may be combined into fewer components, such as into a single component, or divided into more components as may serve a particular implementation.

Additional detail regarding the connector management system will now be provided with reference to the figures. For example, FIG. 9 illustrates a schematic diagram of an example system environment for implementing a connector management system 906 in accordance with one or more implementations. An overview of the connector management system 906 is described in relation to FIG. 9. Thereafter, a more detailed description of the components and processes of the connector management system 906 is provided in relation to the subsequent figures.

As shown, the environment includes server(s) 902, a client device 910, third-party server(s) 916, a database 908, and a network 914. Each of the components of the environment can communicate via the network 914, and the network 914 may be any suitable network over which computing devices can communicate. Example networks are discussed in more detail below in relation to FIGS. 10-11.

As mentioned above, the example environment includes a client device 910. The client device 910 can be one of a variety of computing devices, including a smartphone, a tablet, a smart television, a desktop computer, a laptop computer, a virtual reality device, an augmented reality device, or another computing device as described in relation to FIGS. 10-11. The client device 910 can communicate with the server(s) 902 via the network 914. For example, the client device 910 can receive user input from a user interacting with the client device 910 (e.g., via the client application 912 or the third-party application 918) to, for instance, access, navigate, download, link, or share a data from a third-party application 918 within the third-party server(s) 916, to search for one or more content items or to select a selectable connector suggestion. In addition, the connector management system 906 on the server(s) 902 can receive information relating to various interactions with user interface elements based on the input received by the client device 910 (e.g., to search for one or more content items from the third-party application in the third-party server(s) 916 and the content management system 904).

As shown, the client device 910 can include a client application 912. In particular, the client application 912 may be a web application, a native application installed on the client device 910 (e.g., a mobile application, a desktop application, etc.), or a cloud-based application where all or part of the functionality is performed by the server(s) 902. Based on instructions from the client application 912, the client device 910 can present or display information, including a search result with one or more content items stored or associated with third-party applications.

As illustrated in FIG. 9, the example environment also includes the server(s) 902. The server(s) 902 may generate, track, store, process, receive, search, communicatively link, and transmit electronic data, such as digital content (e.g., content items), datasets, searchable data, pages of data, prompts, interface elements, searches, browsing activity, browsing data, interactions with interface elements, interactions with selectable connector suggestions, and/or interactions between user accounts or client devices. For example, the server(s) 902 may receive data from the client device 910 in the form of a search for a content item or one or more content items related to a topic from a third-party application 918 external to the content management system 904. In addition, the server(s) 902 can transmit data to the client device 910 in the form of a search result with one or more content items associated with the third-party application 918 that is linked to the content management system 904. In some cases, the server(s) 902 can transmit a selectable connector suggestion to link the third-party application 918 with the content management system 904. Indeed, the server(s) 902 can communicate with the client device 910 to send and/or receive data via the network 914. In some implementations, the server(s) 902 comprise(s) a distributed server where the server(s) 902 include(s) a number of server devices distributed across the network 914 and located in different physical locations. The server(s) 902 can comprise one or more content servers, application servers, communication servers, web-hosting servers, machine learning server, and other types of servers.

As shown in FIG. 9, the server(s) 902 can also include the connector management system 906 as part of a content management system 904. The content management system 904 can communicate with the client device 910 to perform various functions associated with the client application 912 such as searching a linked third-party application 918, identifying the third-party application 918 based on browsing data, and/or generating a digital connection between the third-party application 918 and a user account on the content management system 904. Indeed, the content management system 904 can include a network-based smart cloud storage system to manage, store, synchronize, and maintain content items associated with user accounts within the content management system and link the content management system 904 to third-party applications external to the content management system 904. In some embodiments, connector management system 906 and/or the content management system 904 utilize a database to store and access the content items associated with the third-party application 918.

FIG. 9 further illustrates a third-party server(s) 916. In particular, the third-party server(s) 916 can host or house a third-party application 918 that includes or that searches or generates (as part of its native application functions) one or more content items. For example, the third-party server(s) 916 can include a server location hosting the third-party application 918 that is external to the connector management system 906 and the content management system 904. In some cases, the third-party server(s) 916 is external to the connector management system 906, but the connector management system 906 can nevertheless access the third-party application 918 via one or more, connectors, plugins, APIs, or other network-based access protocols.

Although FIG. 9 depicts the connector management system 906 located on the server(s) 902, in some implementations, the connector management system 906 may be implemented by (e.g., located entirely or in part on) one or more other components of the environment. For example, the connector management system 906 may be implemented by the client device 910 and/or a third-party device. For example, the client device 910 can download all or part of the connector management system 906 for implementation independent of, or together with, the server(s) 902.

In some implementations, though not illustrated in FIG. 9, the environment may have a different arrangement of components and/or may have a different number or set of components altogether. For example, the client device 910 may communicate directly with the connector management system 906 bypassing the network 914. As another example, the environment can include the database 908 located external to the server(s) 902 (e.g., in communication via the network 914) or located on the server(s) 902, on a third-party server(s) 916, and/or on the client device 910.

Figure 10:
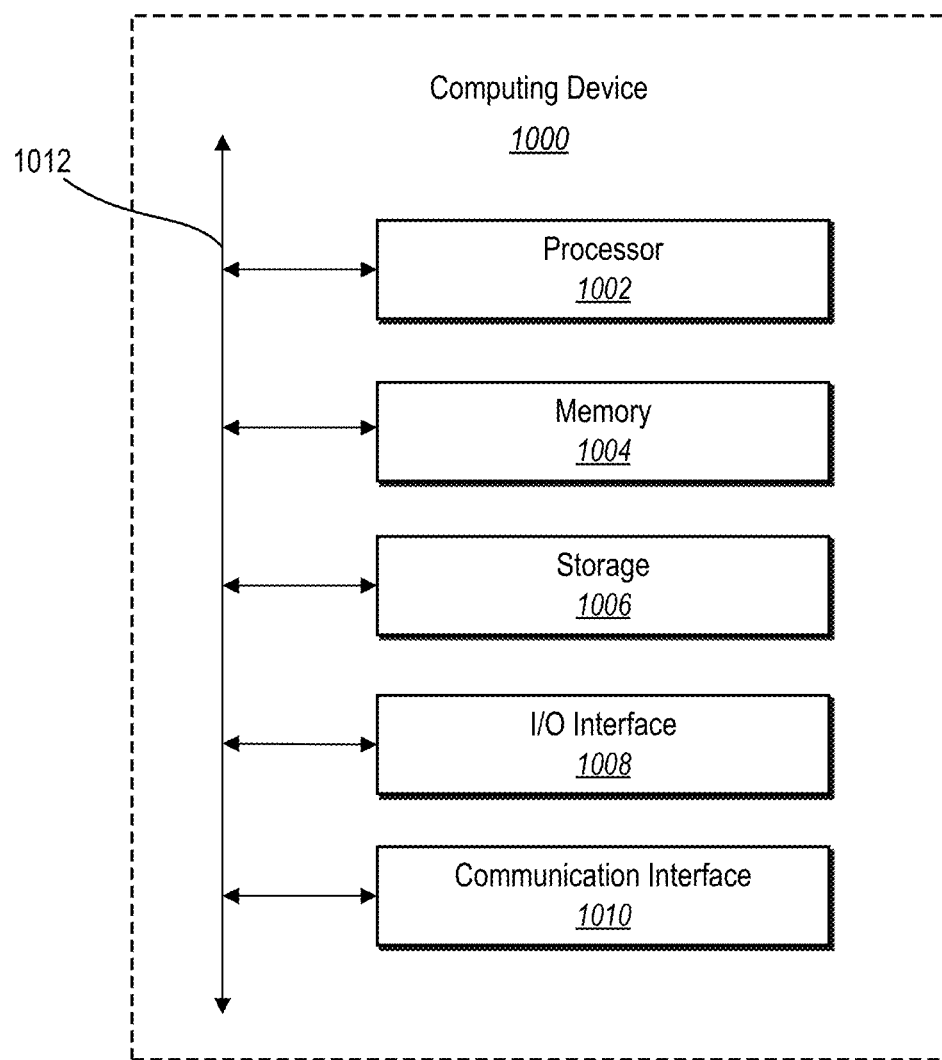
FIG. 10 illustrates a block diagram of an exemplary computing device in accordance with one or more embodiments.

FIG. 10 illustrates a block diagram of exemplary computing device 1000 that may be configured to perform one or more of the processes described above. The components of the connector management system 906 can include software, hardware, or both. For example, the components of the connector management system 906 can include one or more instructions stored on a computer-readable storage medium and executable by processors of one or more computing devices (e.g., the computing device 1000). When executed by the one or more processors, the computer-executable instructions of the connector management system 906 can cause the computing device 1000 to perform the methods described herein. Alternatively, the components of the connector management system 906 can comprise hardware, such as a special purpose processing device to perform a certain function or group of functions. Additionally, or alternatively, the components of the connector management system 906 can include a combination of computer-executable instructions and hardware.

Furthermore, the components of the connector management system 906 performing the functions described herein may, for example, be implemented as part of a stand-alone application, as a module of an application, as a plug-in for applications including content management applications, as a library function or functions that may be called by other applications, and/or as a cloud-computing model. Thus, the components of the connector management system 906 may be implemented as part of a stand-alone application on a personal computing device or a mobile device.

Implementations of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

As mentioned, FIG. 10 illustrates a block diagram of exemplary computing device 1000 that may be configured to perform one or more of the processes described above. One will appreciate that third-party server(s) 902, the client device 910, and/or the computing device 1000 may comprise one or more computing devices such as computing device 1000. As shown by FIG. 10, computing device 1000 can comprise processor 1002, memory 1004, a storage device, a I/O interface, and communication interface 1010, which may be communicatively coupled by way of communication infrastructure 1012. While an exemplary computing device 1000 is shown in FIG. 10, the components illustrated in FIG. 10 are not intended to be limiting.

Additional or alternative components may be used in other implementations. Furthermore, in certain implementations, computing device 1000 can include fewer components than those shown in FIG. 10. Components of computing device 1000 shown in FIG. 10 will now be described in additional detail.

In particular implementations, processor 1002 includes hardware for executing instructions, such as those making up a computer program. As an example, and not by way of limitation, to execute instructions, processor 1002 may retrieve (or fetch) the instructions from an internal register, an internal cache, memory 1004, or storage device 1006 and decode and execute them. In particular implementations, processor 1002 may include one or more internal caches for data, instructions, or addresses. As an example, and not by way of limitation, processor 1002 may include one or more instruction caches, one or more data caches, and one or more translation lookaside buffers (TLBs). Instructions in the instruction caches may be copies of instructions in memory 1004 or storage device 1006.

Memory 1004 may be used for storing data, metadata, and programs for execution by the processor(s). Memory 1004 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. Memory 1004 may be internal or distributed memory.

Storage device 1006 includes storage for storing data or instructions. As an example, and not by way of limitation, storage device 1006 can comprise a non-transitory storage medium described above. Storage device 1006 may include a hard disk drive (HDD), a floppy disk drive, flash memory, an optical disc, a magneto-optical disc, magnetic tape, or a Universal Serial Bus (USB) drive or a combination of two or more of these. Storage device 1006 may include removable or non-removable (or fixed) media, where appropriate. Storage device 1006 may be internal or external to computing device 1000. In particular implementations, storage device 1006 is non-volatile, solid-state memory. In other implementations, Storage device 1006 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1008 allows a user to provide input to, receive output from, and otherwise transfer data to and receive data from computing device 1000. I/O interface 1008 may include a mouse, a keypad or a keyboard, a touch screen, a camera, an optical scanner, network interface, modem, other known I/O devices or a combination of such I/O interfaces. I/O interface 1008 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interface 1008 is configured to provide graphical data to a display for presentation to a user. The graphical data may be representative of one or more graphical interfaces and/or any other graphical content as may serve a particular implementation.

Communication interface 1010 can include hardware, software, or both. In any event, communication interface 1010 can provide one or more interfaces for communication (such as, for example, packet-based communication) between computing device 1000 and one or more other computing devices or networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 1010 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1010 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 1010 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 1012 may include hardware, software, or both that couples components of computing device 1000 to each other. As an example and not by way of limitation, communication infrastructure 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 11:
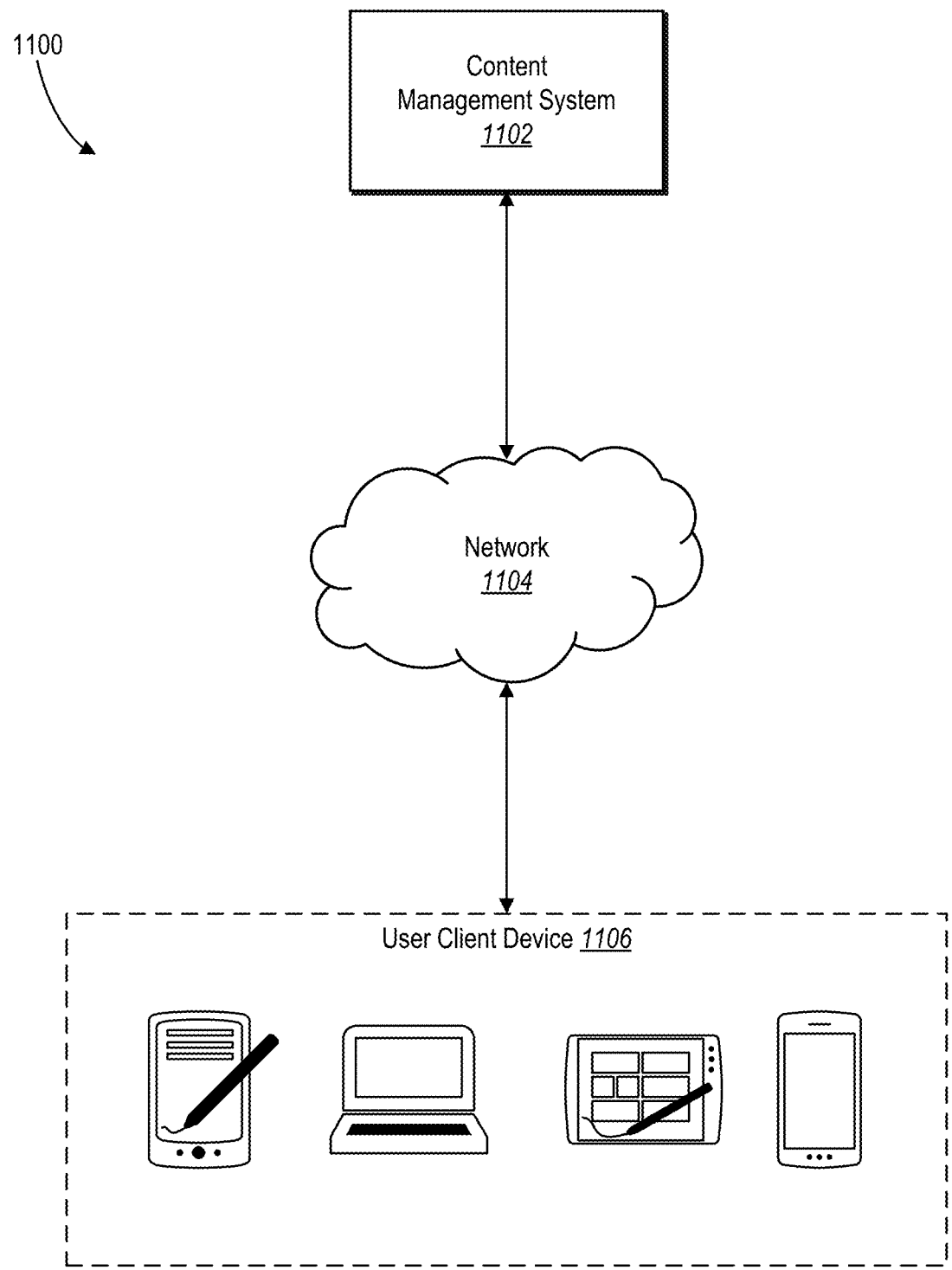
FIG. 11 illustrates a networking environment of a connector management system in accordance with one or more embodiments.

FIG. 11 is a schematic diagram illustrating environment 1100 within which one or more implementations of the connector management system 906 can be implemented. As discussed above with respect to FIG. 9, in some embodiments the connector management system 906 can be part of a content management system 1002. In one or more embodiments, the content management system 1102 may generate, store, manage, receive, and send digital content (such as digital videos). For example, content management system 1102 may send and receive digital content to and from the user client device 1106 by way of network 1104. In particular, the content management system 1102 can store and manage a collection of digital content. The content management system 1102 can manage the sharing of digital content between computing devices associated with a plurality of users. For instance, the content management system 1102 can facilitate a user sharing a digital content with another user of content management system 1102.

In particular, the content management system 1102 can manage synchronizing digital content across multiple of the user client device 1106 associated with one or more users. For example, a user may edit digital content using user client device 1106. The content management system 1102 can cause user client device 1106 to send the edited digital content to content management system 1102. Content management system 1102 then synchronizes the edited digital content on one or more additional computing devices.

In addition to synchronizing digital content across multiple devices, one or more implementations of content management system 1102 can provide an efficient storage option for users that have large collections of digital content. For example, content management system 1102 can store a collection of digital content on content management system 1102, while the user client device 1106 only stores reduced-sized versions of the digital content. A user can navigate and browse the reduced-sized versions (e.g., a thumbnail of a digital image) of the digital content on user client device 1106. In particular, one way in which a user can experience digital content is to browse the reduced-sized versions of the digital content on user client device 1106.

Another way in which a user can experience digital content is to select a reduced-size version of digital content to request the full- or high-resolution version of digital content from content management system 1102. In particular, upon a user selecting a reduced-sized version of digital content, user client device 1106 sends a request to content management system 1102 requesting the digital content associated with the reduced-sized version of the digital content. Content management system 1102 can respond to the request by sending the digital content to user client device 1106. User client device 1106, upon receiving the digital content, can then present the digital content to the user. In this way, a user can have access to large collections of digital content while minimizing the amount of resources used on user client device 1106.

User client device 1106 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. User client device 1106 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.), to access and view content over network 1104.

Network 1104 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which user client devices 1106 may access content management system 1102.

In the foregoing specification, the present disclosure has been described with reference to specific exemplary implementations thereof. Various implementations and aspects of the present disclosure(s) are described with reference to details discussed herein, and the accompanying drawings illustrate the various implementations. The description above and drawings are illustrative of the disclosure and are not to be construed as limiting the disclosure. Numerous specific details are described to provide a thorough understanding of various implementations of the present disclosure.

The present disclosure may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

The foregoing specification is described with reference to specific exemplary implementations thereof. Various implementations and aspects of the disclosure are described with reference to details discussed herein, and the accompanying drawings illustrate the various implementations. The description above and drawings are illustrative and are not to be construed as limiting. Numerous specific details are described to provide a thorough understanding of various implementations.

The additional or alternative implementations may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A system comprising:
   at least one processor; and
   a non-transitory computer readable medium comprising instructions that, when executed by the at least one processor, cause the system to:
   receive, for a user account on a content management system and via a software extension on a browser application, browsing data corresponding to browsing activity associated with a user associated with the user account;
   receive, for the user account on the content management system and via a local content management system application, local browsing data corresponding to local user activity associated with the user associated with the user account;
   identify one or more existing digital connections communicatively linking one or more third-party applications to the user account on the content management system and, from the browsing data and the local browsing data, a third-party application that is external to the content management system;
   provide, based on the one or more existing digital connections, for display on a graphical user interface of a client device, a selectable connector suggestion corresponding to the third-party application; and based on receiving an indication of a selection of the selectable connector suggestion, generate a digital connection that communicatively links the third-party application to the user account on the content management system.

2. The system of claim 1, further comprising instructions that, when executed by the at least one processor, cause the system to:
generate based on the browsing data and the local browsing data, a third-party relevance prediction for the third-party application; and
based on the third-party relevance prediction, provide for display on the graphical user interface of the client device, the selectable connector suggestion corresponding to the third-party application.

3. The system of claim 1, further comprising instructions that, when executed by the at least one processor, cause the system to:
detect a launch of an additional third-party application external to the content management system from the local content management system application; and
provide for display on the graphical user interface of the client device, an additional selectable connector suggestion corresponding to the additional third-party application.

4. The system of claim 1, further comprising instructions that, when executed by the at least one processor, cause the system to:
receive, from the client device, temporary access to a subset of content items within the third-party application for a limited period of time; and
based on the temporary access, generate a temporary digital connection that communicatively links the subset of content items within the third-party application to the user account on the content management system for the limited period of time.

5. The system of claim 1, further comprising instructions that, when executed by the at least one processor, cause the system to:
identify one or more existing digital connections communicatively linking one or more third-party applications to the user account on the content management system;
based on the one or more existing digital connections, provide for display on a graphical user interface of a client device, an additional selectable connector suggestion corresponding to an additional third-party application; and
based on receiving an additional indication of a selection of the selectable connector suggestion, generate a digital connection that communicatively links the additional third-party application to the user account on the content management system.

6. The system of claim 1, further comprising instructions that, when executed by the at least one processor, cause the system to:
identify collective browsing data corresponding to collective browsing activity associated with a set of users associated with a set of user accounts within an entity;
identify, from the collective browsing data, a third-party application that is external to the content management system;
provide for display on a graphical user interface of an administrator client device associated with an administrative user account, a selectable connector suggestion corresponding to the third-party application; and
based on receiving an indication of a selection of the selectable connector suggestion from the administrator client device associated with the administrative user account, generate a shared digital connection that communicatively links the third-party application to the set of user accounts on the content management system.

7. A computer-implemented method comprising:
receiving, for a user account on a content management system and via a software extension on a browser application, browsing data corresponding to browsing activity associated with a user associated with the user account;
identifying one or more existing digital connections communicatively linking one or more third-party applications to the user account on the content management system and, from the browsing data, a third-party application that is external to the content management system;
providing, based on the one or more existing digital connections, for display on a graphical user interface of a client device, a selectable connector suggestion corresponding to the third-party application; and
based on receiving an indication of a selection of the selectable connector suggestion, generating a digital connection that communicatively links the third-party application to the user account on the content management system.

8. The computer-implemented method of claim 7, further comprising:
generating, based on the browsing data, a third-party relevance prediction for the third-party application; and
based on the third-party relevance prediction, providing the selectable connector suggestion corresponding to the third-party application.

9. The computer-implemented method of claim 7, further comprising:
detecting within a content item stored on the content management system, an embedding associated with an additional third-party application external to the content management system; and
providing for display on the graphical user interface of the client device, an additional selectable connector suggestion corresponding to the additional third-party application.

10. The computer-implemented method of claim 7, further comprising:
detecting a search query associated with an additional third-party application based on the browsing data; and
based on the search query associated with the additional third-party application, generating an additional selectable connector suggestion corresponding to the additional third-party application.

11. The computer-implemented method of claim 7, further comprising:
receiving, from the client device, temporary access to a subset of content items within the third-party application; and
based on the temporary access, generating a temporary digital connection that communicatively links the subset of content items within the third-party application to the user account on the content management system.

12. The computer-implemented method of claim 7, further comprising:
identifying a software suite corresponding to a set of third-party applications;
providing for display on the graphical user interface of the client device, a selectable suite connector suggestion corresponding to the set of third-party applications; and based on receiving an additional indication of an additional selection of the selectable suite connector suggestion, generating a set of digital connections that communicatively link the set of third-party applications to the user account on the content management system.

13. The computer-implemented method of claim 7, further comprising:
identifying collective browsing data corresponding to collective browsing activity associated with a set of users associated with a set of user accounts within an entity;
identifying, from the collective browsing data, one or more additional third-party applications that are external to the content management system;
providing for display on a graphical user interface of a client device associated with an administrative user account, one or more additional selectable connector suggestions corresponding to the one or more additional third-party applications; and
based on receiving an additional indication of an additional selection of the one or more additional selectable connector suggestions from the client device associated with the administrative user account, generating one or more digital connections that communicatively links the one or more additional third-party applications to the set of user accounts on the content management system.

14. A non-transitory computer readable medium comprising instructions that, when executed by at least one processor, cause the at least one processor to:
receive, for a user account on a content management system, browsing data corresponding to browsing activity associated with a user associated with the user account;
identify one or more existing digital connections communicatively linking one or more third-party applications to the user account on the content management system and, from the browsing data, a third-party application that is external to the content management system;
provide, based on the one or more existing digital connections, for display on a graphical user interface of a client device, a selectable connector suggestion corresponding to the third-party application;
based on receiving an indication of a selection of the selectable connector suggestion, request authentication credentials for the third-party application; and
based on receiving the authentication credentials, generate a digital connection that communicatively links the third-party application to the user account on the content management system.

15. The non-transitory computer readable medium of claim 14, further comprising instructions that, when executed by the at least one processor, cause the at least one processor to:
generate, utilizing a suggestion model, a third-party relevance prediction for the third-party application based on the browsing data; and
based on the third-party relevance prediction, provide for display on the graphical user interface of the client device, the selectable connector suggestion corresponding to the third-party application.

16. The non-transitory computer readable medium of claim 14, further comprising instructions that, when executed by the at least one processor, cause the at least one processor to:
determine a digital connection threshold corresponding to a number of digital connections for the user account on the content management system; and
provide for display on the graphical user interface of the client device, one or more additional selectable connector suggestions corresponding to one or more third-party applications to exceed the digital connection threshold.

17. The non-transitory computer readable medium of claim 14, further comprising instructions that, when executed by the at least one processor, cause the at least one processor to:
generate sample data comprising one or more content items stored on one or more third-party applications communicatively linked the content management system;
receive from the client device associated with the user account a search query of the sample data; and
in response to receiving the search query, provide for display on the client device a search result comprising one or more source content items from the one or more third-party applications.

18. The non-transitory computer readable medium of claim 14, further comprising instructions that, when executed by the at least one processor, cause the at least one processor to:
receive, from the client device associated with the user account one or more additional authentication credentials for one or more third-party applications external to the content management system; and
based on receiving the one or more additional authentication credentials, generate a temporary digital connection that communicatively links source content items within the one or more third-party applications to the user account on the content management system for a limited period of time.

19. The non-transitory computer readable medium of claim 14, further comprising instructions that, when executed by the at least one processor, cause the at least one processor to:
identify collective browsing data corresponding to collective browsing activity associated with a set of users associated with a set of user accounts within an entity;
identify, from the collective browsing data, an additional third-party application that is external to the content management system;
provide for display on a graphical user interface of a client device associated with an administrative user account, an additional selectable connector suggestion corresponding to the additional third-party application; and
based on receiving an additional indication of an additional selection of the additional selectable connector suggestion, generate one or more digital connections that communicatively links the additional third-party application to the set of user accounts on the content management system.

20. The non-transitory computer readable medium of claim 14, further comprising instructions that, when executed by the at least one processor, cause the at least one processor to:
detect from the browsing data a search query associated with an additional third-party application external to the content management system;
based on the search query associated with the additional third-party application, generate an additional selectable connector suggestion corresponding to the additional third-party application; and based on receiving an additional indication of an additional selection of the additional selectable connector suggestion, generate an additional digital connection that communicatively links the third-party application to the user account on the content management system.

* * * * *